United States Patent [19]

Ohuchida et al.

[11] Patent Number: 5,015,835
[45] Date of Patent: May 14, 1991

[54] OPTICAL INFORMATION READING AND WRITING DEVICE WITH DIFFRACTION MEANS

[75] Inventors: Shigeru Ohuchida, Zama; Junichi Kitabayashi, Kawasaki; Toshiyuki Inokuchi, Yokohama, all of Japan

[73] Assignee: Ricoh Company, Ltd., Tokyo, Japan

[21] Appl. No.: 454,366

[22] Filed: Dec. 21, 1989

[30] Foreign Application Priority Data

Dec. 23, 1988 [JP] Japan .................. 63-325295
Mar. 30, 1989 [JP] Japan .................. 1-79126
Jul. 10, 1989 [JP] Japan .................. 1-177751

[51] Int. Cl.$^5$ ............................................. G01J 1/20
[52] U.S. Cl. .................................. 250/201.5; 250/237 R; 369/44.23
[58] Field of Search ............ 250/201.5, 237 G, 237 R; 369/44.23, 44.27, 44.11, 44.12, 44.41, 44.42; 350/162.2, 162.21, 162.22, 3.72, 3.73, 3.83

[56] References Cited

U.S. PATENT DOCUMENTS

| | | | |
|---|---|---|---|
| 4,425,636 | 1/1984 | Musha et al. | 250/201.5 |
| 4,525,625 | 6/1985 | Abe | 250/201.5 |
| 4,672,187 | 6/1987 | Fujita et al. | 250/201.5 |
| 4,689,481 | 8/1987 | Ono | 250/201.5 |
| 4,742,218 | 5/1988 | Nakamura et al. | 250/201.5 |
| 4,850,673 | 7/1989 | Velzel et al. | 369/44.23 |
| 4,858,215 | 8/1989 | Yano et al. | 250/201.5 |
| 4,935,911 | 6/1990 | Ohuchida et al. | 369/44.12 |
| 4,945,527 | 7/1990 | Sunagawa | 369/44.11 |

FOREIGN PATENT DOCUMENTS 0153735  6/1988  Japan ................. 369/44.12

*Primary Examiner*—David C. Nelms
*Assistant Examiner*—Michael Messinger
*Attorney, Agent, or Firm*—Cooper & Dunham

[57] ABSTRACT

An optical information reading and writing device comprising a laser source which emits a laser beam for irradiating an optical recording disk to record an information therein and an optical signal detection system which receives a reflection beam reflected from the disk surface and controls position of the disk. The optical signal detection system comprises a condenser lens for converging the reflection beam and a dual grating element which has linear diffraction gratings formed on its both side surfaces. The incident side grating divides the reflection beam to two beams, one being a beam which is diffracted by the grating and the other being a beam which passes substantially straight through the grating without being diffracted thereby. The optical signal detection system further comprises a pair of three-segment light receiving detector elements for detecting the divided two beams. The two detector elements are disposed on a same plane.

11 Claims, 12 Drawing Sheets

FE < 0

FE = 0

FE > 0

FE < 0

FE = 0

FE > 0

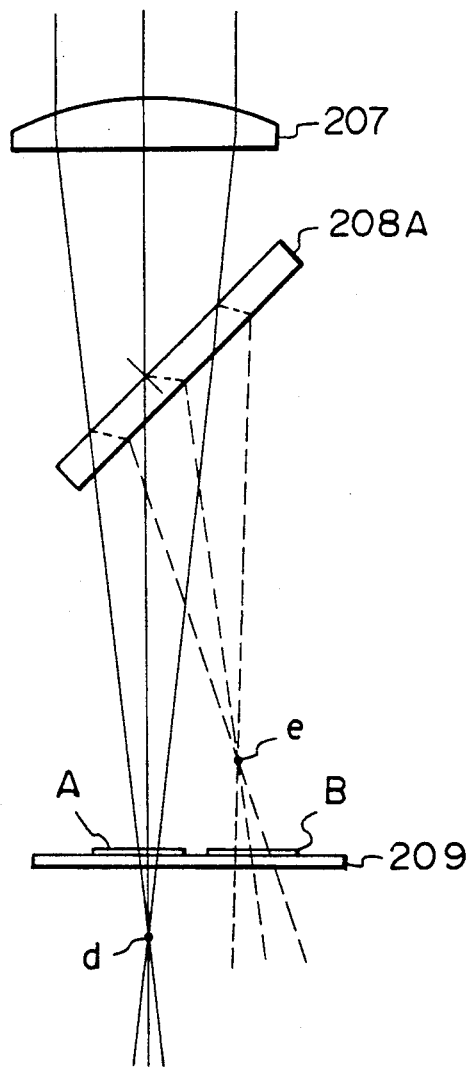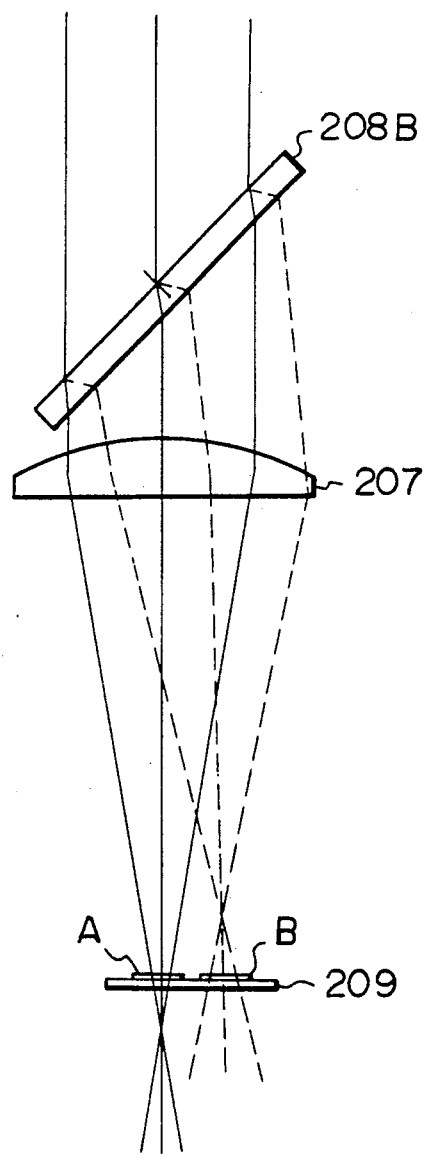
Fig. 17
Fig. 18

Fig. 22
Fig. 23a
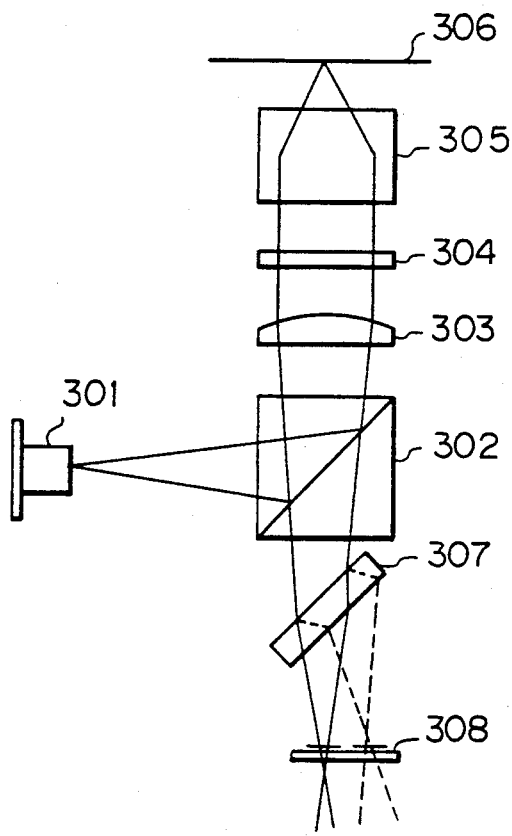
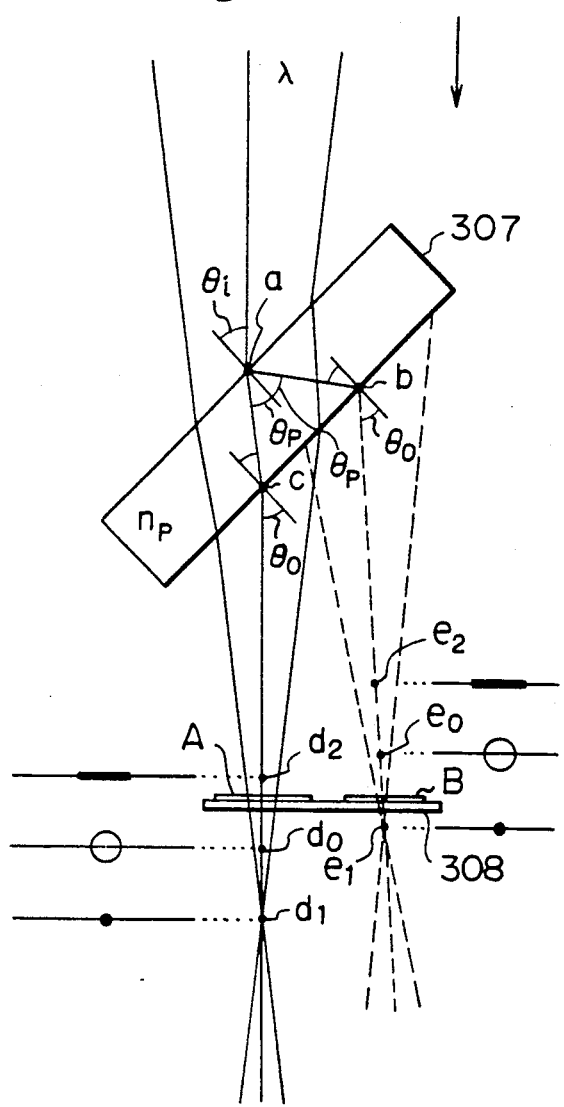
Fig. 23b
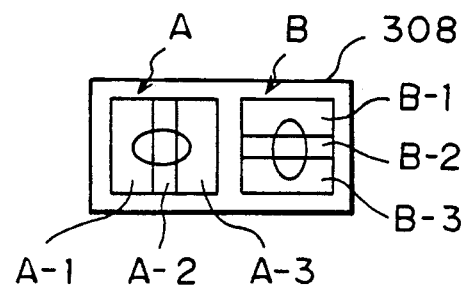

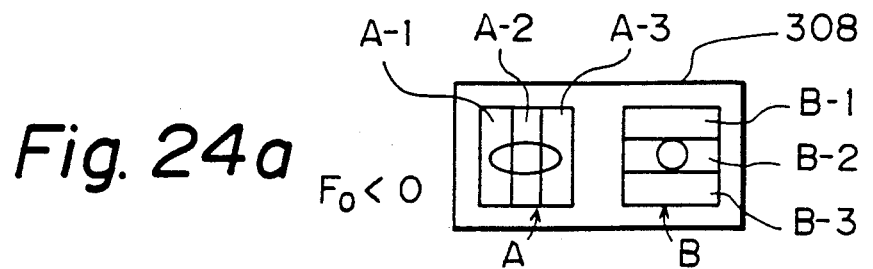
Fig. 24a  $F_0 < 0$
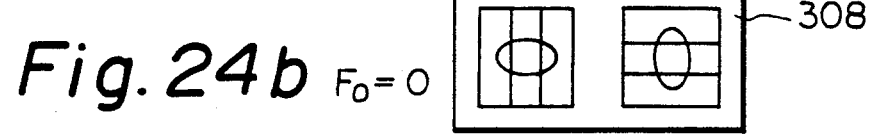
Fig. 24b  $F_0 = 0$
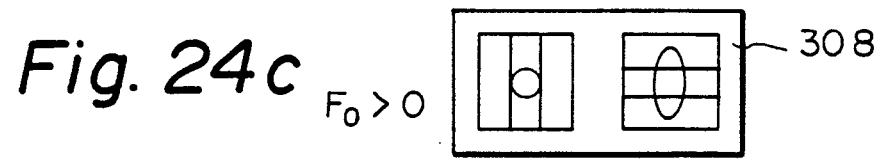
Fig. 24c  $F_0 > 0$
Fig. 25
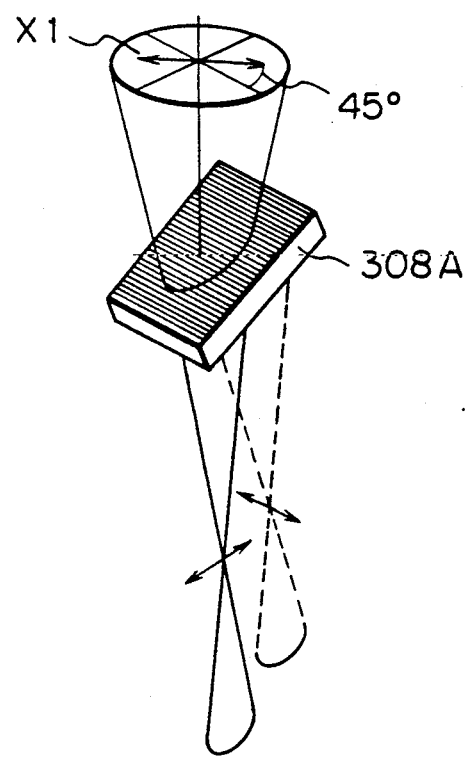

OPTICAL INFORMATION READING AND WRITING DEVICE WITH DIFFRACTION MEANS

BACKGROUND OF THE INVENTION

1. Field of the Invention

The present invention relates to an optical information reading and writing device using an optical information data recording medium.

More particularly, the present invention relates to an optical pickup device for focus control and/or tracking control of the optical information reading and writing device with the use of reflection rays emitted from the optical information data recording medium.

The present invention further relates to a method for detecting focus error of the optical system of the information data reading and writing device. The method can be used for controlling focus of the optical system for converging rays and irradiating them to an optical information data recording medium such as an optical disk, a prototype thereof and magneto-optical disk.

2. Description of the Related Art

An example of a system for focus control and/or tracking control in response to the reflection rays from the optical information data recording medium comprises a semiconductor laser element, a collimator lens for paralleling rays emitted from the semiconductor element, a beam splitter through which the parallel rays pass, an objective lens for converging the parallel rays and irradiating them to a magneto-optical disk on which optical information data is recorded. A part of the rays reflected by the disk propagates back to the beam splitter which reflects the rays and guides them to an optical signal detection system for detecting data signals from the magneto-optical disk.

The optical signal detection system comprises a half-wave plate, a condenser lens, a microprism detector comprising a microprism, a polarization beam splitter and an optical detector comprising a light receiving element which is divided to three parts. The reflection rays from the disk pass through the halfwave plate, the condenser lens and the microprism in the optical signal detection system. The reflection rays then either propagate further through the polarization beam splitter or are reflected by the polarization beam splitter. The rays which pass the polarization beam splitter are guided directly to the light receiving element. Whereas rays which are reflected by the polarization beam splitter are guided to the light receiving element through a mirror.

The focus error signals and magneto-optical data signals are obtained by comparing the optical amount of the light detected by the two parts of the light receiving element in accordance with for example a beam size method known per se, so as to control the focus of the magneto-optical disk and read the information data.

A second example of a system for focus control and/or tracking control in response to the reflection rays from the optical information data recording medium comprises a semiconductor laser element, a collimator lens for paralleling the optical rays emitted from the semiconductor laser element, a polarization beam splitter for reflecting the parallel rays, a quarter-wave plate and an objective lens for converging the rays and irradiating them to an optical disk. A part of the rays reflected by the optical disk surface propagates back toward the polarization beam splitter. The reflection rays pass the polarization beam splitter which guides the rays to an optical signal detection system for detecting information data from the optical disk.

In this optical signal detection system, the reflection rays from the optical disk are converged by a condenser lens and then either pass through or are reflected by a beam splitter. After that, the rays are detected by a light receiving element which is disposed on each of the optical paths for rays which pass through the beam splitter and rays which are reflected by the beam splitter. The focus error signals are obtained from the detection result of the two light receiving elements so as to control and adjust the focus of the optical disk.

With regard to the first example of the focus and tracking control system mentioned above, the optical signals are detected by the microprism detector of the optical signal detection system wherein the microprism and the detector are mounted on a same support plate. Therefore, it is difficult to individually adjust each position of the two optical spots, one being formed by rays which pass through the polarization beam splitter and the other being formed by rays which are reflected by the polarization beam splitter and the two spots being detected by a different optical detector, respectively.

Also, with regard to the second example of the focus and tracking control system mentioned above, the two light receiving elements are arranged perpendicular to each other in the optical signal detection system. Therefore, relatively large area is required for arranging the system, which impedes to realize a small and compact optical control system.

On the other hand, Japanese patent application Laying Open (KOKAI) No. 61230634 discloses an optical information reading and writing device using a diffraction grating.

In accordance with a first example of an optical information reading and writing device using a diffraction grating, a laser beam of rays emitted from a semiconductor laser element is made parallel by a collimator lens and irradiated to a polarization beam splitter. The diffraction direction of the polarization beam splitter is prearranged in parallel with the direction of the grooves thereof so that the incident light is diffracted toward a quarter-wave plate which converts the light to a circularly polarized light. The circularly polarized light is then converged by an objective lens and irradiated to an optical disk which is a medium for recording optical information data.

Also, a part of reflection rays from the surface of the optical disk propagates back to the quarter-wave plate which converts the light to a linearly polarized light. The linearly polarized light passes through the polarization beam splitter and is guided to a critical angle diffraction grating of an optical information detection system.

In this optical information detection system, the incident light is diffracted through two times of critical angle diffraction and a total reflection. After that, the diffracted light propagates to a light receiving element which is divided to four parts (segments). Focus error signals and/or track error signals are obtained from the difference of output signals between the four parts of the light receiving element.

A second example of the optical information reading and writing device using a diffraction grating means comprises a dual grating. In accordance with this second example, a laser beam of rays emitted from a semiconductor laser element is made parallel by a collimator lens and after that passes through two beam shaping prisms. The laser beam is then reflected by a beam splitter and converged by an objective lens and irradiated to a magneto-optical disk so that information data is recorded thereon.

Also, a part of the reflection light from the surface of the magneto-optical disk propagates back through the beam splitter and is guided to an optical information detection system. In the optical information detection system, the reflection beam is converged by a condenser lens and after that passes through the two gratings formed on the upper and lower surfaces of the dual grating element in either way of penetrating substantially straight therethrough or being diffracted thereby.

The zero-order light which penetrates substantially straight through the dual grating element is guided to a light receiving element which is divided to four parts (segments). Whereas the first-order light which is diffracted by the dual grating element is guided to another light receiving element which is divided to two parts.

A magneto-optical signal is obtained from the optical amount difference between the zero-order light and the first-order light. Also, a focus error signal is obtained from the zero-order light using a method of astigmatism. Further, a track error signal is obtained from the first-order light using a push-pull method.

With respect to the first example of the optical information reading and writing device using a diffraction grating means mentioned before, the device can be applied to a write-once optical disk system and a CD (compact disk) system, however, cannot be applied to a system for detecting signals from a magneto-optical disk. Also, the device of the first example involves a problem that the diffraction angle of the grating changes in response to change of wavelength of the light which passes through the grating.

Also, with regard to the second example of the optical information reading and writing device using a diffraction grating means mentioned above, a sufficient accuracy can not be obtained concerning the distance between the zero-order light and the first-order light so that the optical spot is often dislocated, which causes errors of detection and impairs the reliability of the result of signal detection.

In an optical system such as an optical pickup device or an optical disk prototype exposure system (or aligner), an exposure beam is converged and irradiated to the recording surface of the optical information data recording medium, i.e., an optical disk or an optical disk prototype. Such an optical system comprises a focus control system for controlling the focal point thereof so as to coincide the convergent point of the exposure beam and the disk surface to be irradiated. In order to reliably conduct such a focus control, it is necessary to detect the focus error, that is the dislocation between the convergent point of the exposure beam and the recording surface of the medium to be irradiated by the beam.

In order to detect such a focus error, for example, a double beam size method is used. In accordance with this method, the focus error is detected in such a way that a reflection beam of rays reflected from the surface of the optical information recording medium is divided to two convergent beams and that the sectional size of each of the divided two beams is detected so as to determine the dislocation of the focal point on the basis of the sectional sizes of the two beams.

Various method can be used for dividing the reflection beam from the information recording medium surface in the above-mentioned double beam size method for detecting the focus error. Examples of such a beam dividing method are a method using a single hologram (disclosed in Japanese patent application Laying Open (KOKAI) No. 58-121644), a method using parallel plane mirrors (disclosed in Japanese patent application Laying Open (KOKAI) No. 60-43234) and a method using a Wollaston prism (disclosed in Japanese patent application Laying Open (KOKAI) No. 62-26444).

However, with regard to the beam dividing method using a single hologram, there is a problem that the diffraction angle changes according as the wavelength of the beam changes, which causes detection errors of the focus dislocation. Therefore, a semiconductor laser element can not be used as a light source of the exposure beam since the wavelength of the semiconductor laser fluctuates.

Also, with regard to the beam dividing method using parallel plane mirrors, one of the divided two beams generates astigmatism due to the refractive function of the mirror system. Therefore, the reflection beam is not evenly divided, which causes errors of detecting the focus dislocation.

Also, with regard to the beam dividing method using a Wollaston prism, uneven astigmatism is generated in the two divided beams due to the double refraction of the prism system, which causes errors of detecting the focus dislocation.

Besides, in accordance with the double beam size method mentioned above, if the distance between the two convergent points of the divided beams is large, the size of the light receiving detector element have to be enlarged. Therefore, in order to realize a compact structure, there arises a problem that the range of detecting the focus dislocation becomes narrow.

SUMMARY OF THE INVENTION

It is therefore an object of the present invention to provide an optical information reading and writing device which makes it possible to effectively use the space for arranging the device and reduce the area for mounting the device by improving the optical system for guiding the optical signals to the light receiving detector element.

It is another object of the present invention to provide an optical information reading and writing device in which the signal detection sensitiveness is heightened and the focus dislocation is reliably avoided.

The object of the invention can be achieved by an optical information reading and writing device such as an optical pickup device which comprises an optical signal detection system for detecting reflection rays reflected from an optical information recording medium to control its position comprising: a laser light source which emits a laser beam for irradiating the optical information recording medium to record information data therein; a condenser lens disposed on an optical path of the optical signal detection system for converging the reflection rays reflected from the optical information recording medium; a double-side (dual) grating element which has a substantially linear diffraction grating formed on each of both sides thereof through which the reflection rays pass substantially straight and in a state of being diffracted; and two optical detecting elements for detecting reflection rays which pass through the grating element substantially straight and in the state of being diffracted, respectively, each detecting element being divided to three parts and the two detecting elements being disposed in a same plane.

In accordance with the above-mentioned structure, the reflection rays reflected from the optical information recording medium are converged by the condenser lens of the optical signal detection system and pass through the double-side grating element penetrating therethrough substantially straight or in a state of being diffracted by the grating so that the reflection rays are divided to two beams of rays propagating in directions close to each other. Each of the two beams are irradiated to a respective light receiving detecting element which is divided to three parts so as to detect the focus error signals on the basis of the outputs from the two detecting elements.

An advantage of the above-mentioned information reading and writing device is that a focus error signal, a track error signal and a magneto-optical signal can be detected by the different two light receiving elements each being divided to three parts in such a way that the reflection rays reflected from the optical information recording medium are guided to pass through the double-side grating element which separates the rays to two directions close to each other one being for rays which pass substantially straight through the grating element and the other being for rays which are diffracted by the grating element, whereby it becomes possible to reduce the space for installing the optical system of the information reading and writing device.

The above-mentioned object of the invention can also be achieved by an optical information reading and writing device such as an optical pickup device which comprises an optical signal detection system for detecting reflection rays reflected from an optical information recording medium to control its position comprising: a laser light source which emits a laser beam for irradiating the optical information recording medium to record information data therein; a condenser lens disposed on an optical path of the optical signal detection system for converging the reflection rays reflected from the optical information recording medium; a double-side grating element which has a substantially linear diffraction grating formed on one of both sides thereof and a diffraction grating having a lens function in one direction on the other side thereof through which element the reflection rays pass substantially straight and in a state of being diffracted; and two optical detecting elements for detecting reflection rays which pass through the grating element substantially straight and in the state of being diffracted, respectively, each detecting element being divided to three parts and the two detecting elements being disposed in a same plane.

In accordance with the above-mentioned structure, the reflection rays reflected from the optical information recording medium are converged by the condenser lens of the optical signal detection system and pass through the double-side grating element penetrating therethrough either substantially straight or in a state of being diffracted by the function of the above-mentioned double-side grating element so that the reflection rays are divided to two beams of rays propagating in directions close to each other. Each of the two beams are irradiated to a respective light receiving detecting element which is divided to three parts so as to detect the focus error signals on the basis of the outputs from the two detecting elements.

An advantage of the above-mentioned information reading and writing device is that the signal detection sensitiveness can be heightened due to the diffractive lens function of the diffractive grating formed on one of the sides of the double-side grating element.

Further objects and advantages of the present invention will be apparent from the following description of the preferred embodiments of the invention as illustrated in the accompanying drawings.

BRIEF DESCRIPTION OF THE DRAWINGS

FIGS. 7b and 7c are front views of the optical detecting elements each being arranged in the information reading and writing device of FIG. 7a;

FIG. 9b is a side view of the dual grating of FIG. 9a;

FIG. 12b is a side view of the dual grating element of FIG. 12a;

FIG. 14b is a circuit diagram for detecting various signals in accordance with the information reading and writing device of FIG. 14a;

FIG. 17 is a constructional view of another example of an optical pickup device in accordance with the present invention;

FIG. 18 is a constructional view of still another example of an optical pickup device in accordance with the present invention;

FIG. 22 is a constructional view of a still another example of the optical pickup device to which the present invention is applied;

FIG. 23a is an explanatory view for explaining the function of the optical pickup device of FIG. 22;

FIG. 23b is another explanatory view for explaining the function of the optical pickup device of FIG. 22;

FIG. 24a is an explanatory view for explaining the focus dislocation detection method applied to an optical pickup device in accordance with the present invention, representing a state of being out of focus;

FIG. 24b is an explanatory view for explaining the focus dislocation detection method applied to an optical pickup device in accordance with the present invention, representing a state of being in focus;

FIG. 24c is an explanatory view for explaining the focus dislocation detection method applied to an optical pickup device in accordance with the present invention, representing another state of being out of focus; and FIG. 25 is an explanatory view for explaining another example of focus dislocation detection method in accordance with the present invention.

DESCRIPTION OF THE PREFERRED EMBODIMENTS

Figure 1:
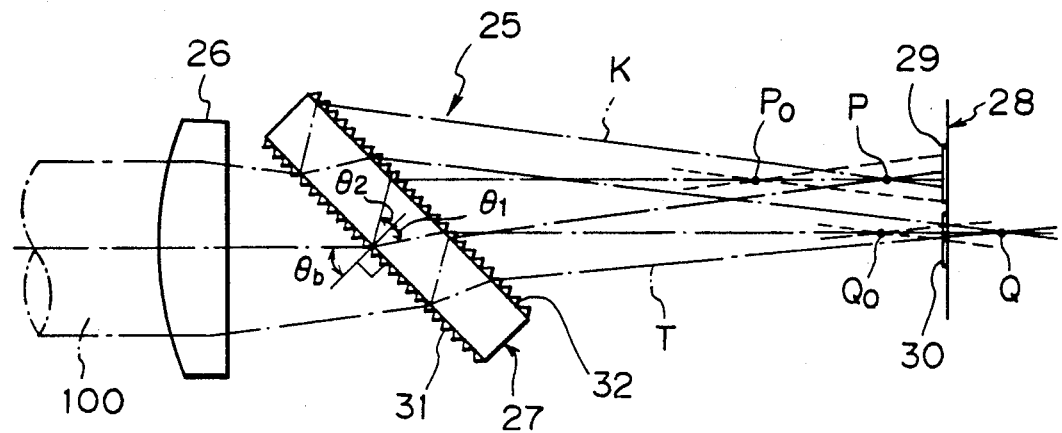
FIG. 1 is a partial constructional side view of an embodiment of the optical information reading and writing device in accordance with the present invention.

Embodiments of the present invention are described hereinafter with reference to the drawings in comparison to the related art which also illustrated in the drawings.

Figure 5:
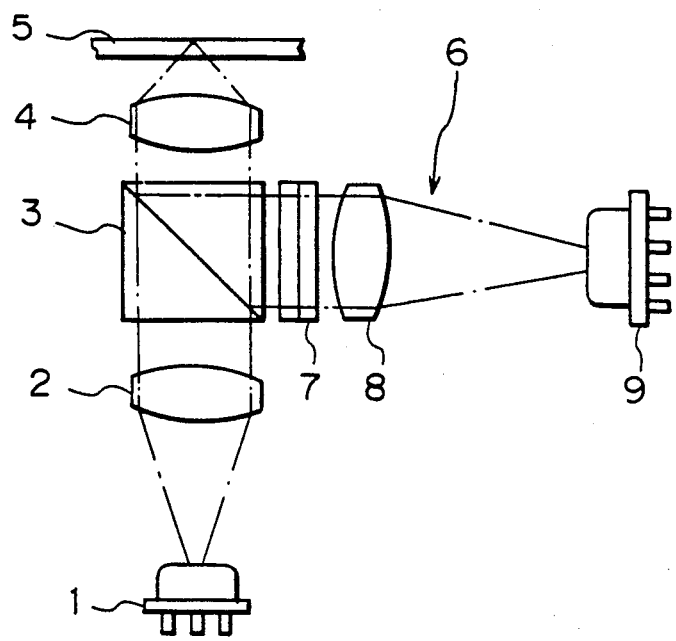
FIG. 5 is a constructional view of an example of an information reading and writing device of the related art.

FIG. 5 illustrates an example of an optical information reading and writing device.

The illustrated example of a system for focus control and/or tracking control in response to the reflection rays from the optical information data recording medium comprises a semiconductor laser element 1, a collimator lens 2 for paralleling rays emitted from the semiconductor element 1, a beam splitter 3 through which the parallel rays pass, an objective lens 4 for converging the parallel rays and irradiating them to a magneto-optical disk 5 on which optical information data is recorded. A part of the rays reflected by the disk 5 propagates back to the beam splitter 3 which reflects the rays and guides them to an optical signal detection system 6 for detecting data signals from the magneto-optical disk 5.

Figure 6:
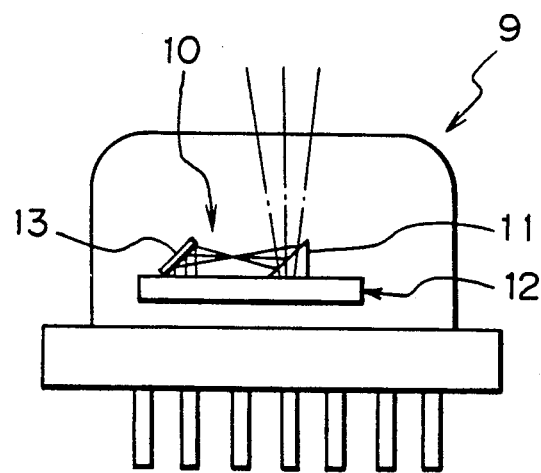
FIG. 6 is an enlarged side view of a microprism detector used in the optical system of FIG. 5.

The optical signal detection system comprises a halfwave plate 7, a condenser lens 8, a microprism detector 9 (see FIG. 6) comprising a microprism 10, a polarization beam splitter 11 and an optical detector 12 comprising a light receiving element (not shown) which is divided to three parts. The reflection rays from the disk 5 pass through the halfwave plate 7, the condenser lens 8 and the microprism 10 in the optical signal detection system. The reflection rays then either propagates further through the polarization beam splitter 11 or are reflected by the polarization beam splitter 11. The rays which pass the polarization beam splitter 11 are guided directly to the light receiving element. Whereas rays which are reflected by the polarization beam splitter 11 are guided to the light receiving element through a mirror 13.

The focus error signals and magneto-optical data signals are obtained by comparing the optical amount of the light detected by the two parts of the light receiving element in accordance with for example a beam size method known per se, so as to control the focus of the magneto-optical disk and read the information data therefrom.

Figure 7A:
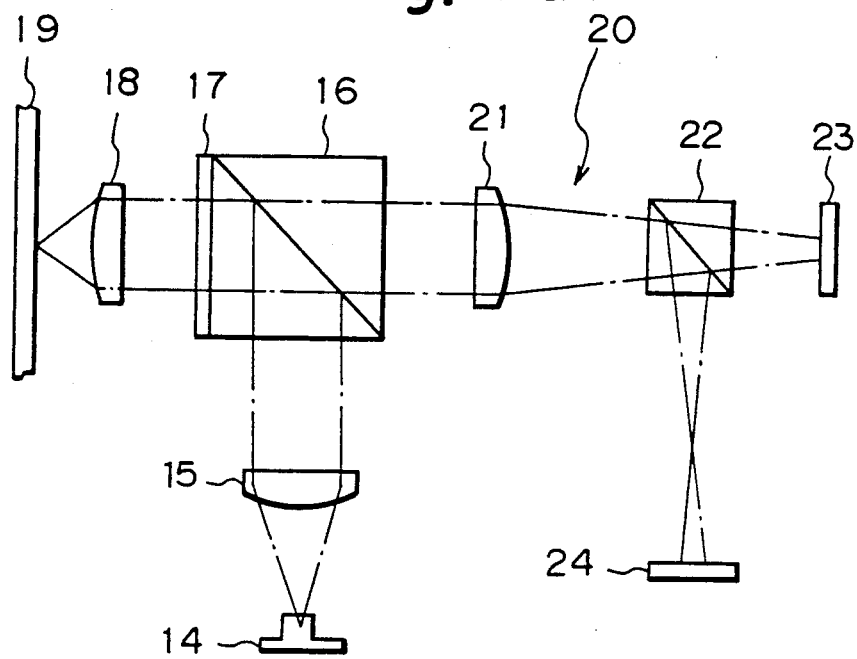
FIG. 7a is a constructional view of another example of an information reading and writing device of the related art.
Figure 7B:
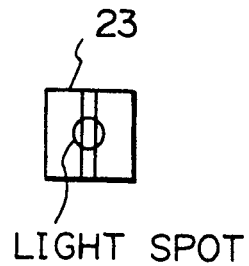
Figure 7C:
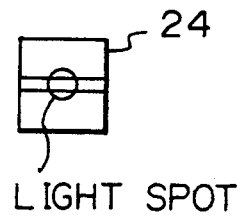

FIGS. 7a to 7c illustrate a second example of a system for focus control and/or tracking control in response to the reflection rays from the optical information data recording medium.

The second example comprises a semiconductor laser element 14, a collimator lens 15 for paralleling the optical rays emitted from the semiconductor laser element 14, a polarization beam splitter 16 for reflecting the parallel rays, a quarter-wave plate 17 and an objective lens 18 for converging the rays and irradiating them to an optical disk 19. A part of the rays reflected by the optical disk surface propagates back toward the polarization beam splitter 16. The reflection rays pass the polarization beam splitter 16 which guides the rays to an optical signal detection system 20 for detecting information data from the optical disk 19.

In this optical signal detection system 20, the reflection rays from the optical disk 19 are converged by a condenser lens 21 and then either pass through or are reflected by a beam splitter 22. After that, the rays are detected by two light receiving elements 23 and 24, respectively, each of which is disposed on each of the optical paths for rays which pass through the beam splitter 22 and rays which are reflected by the beam splitter 22. The focus error signals are obtained from the detection result of the two light receiving elements 23 and 24 so as to control and adjust the focus of the optical disk 19.

With regard to the first example of the focus and tracking control system mentioned above, the optical signals are detected by the microprism detector 9 of the optical signal detection system 6 wherein the microprism 10 and the detector 12 are mounted on a same support plate. Therefore, it is difficult to individually adjust each position of the two optical spots, one being formed by rays which pass through the polarization beam splitter 3 and the other being formed by rays which are reflected by the polarization beam splitter 3 and the two spots being detected by a different optical detector, respectively.

Also, with regard to the second example of the focus and tracking control system mentioned above, the two light receiving elements 23 and 24 are arranged perpendicular to each other in the optical signal detection system 20. Therefore, relatively large area is required for arranging the system, which impedes to realize a small and compact optical control system.

The above-mentioned problems are attenuated by an embodiment of the present invention described below with reference to FIGS. 1 and 2a to 2c. The description below refers only to an optical signal detection system in accordance with the present invention without referring to a whole structure of the optical pickup device in which the optical signal detection system is installed.

A reflection beam 100 reflected from an optical disk (not shown) which is used as an optical information recording medium is guided to an optical signal detection system 25. A condenser lens 26 is disposed on an optical path of the reflection beam 100. A dual grating element 27 is also disposed on the optical path of the reflection beam 100 behind the condenser lens 26. A part of the reflection beam 100 passes substantially straight through the dual grating element 27 while the other part of the reflection beam 100 is diffracted by the dual grating element 27. On the optical path of the beam passing substantially straight through the dual grating element 27 is disposed a light receiving detector element 30 which is divided to three parts (not shown). Also, on the optical path of the beam diffracted by the dual grating element 27 while passing therethrough is disposed another light receiving detector element 29 which is also divided to three parts (not shown). The two light receiving detector elements 29 and 30 are arranged on a same plane of a substrate plate 28 for supporting the detector elements 29 and 30 thereon.

The dual grating element 27 comprises a transparent substrate having substantially linear diffraction gratings 31 and 32 formed on both sides thereof. The grating directions of the two diffraction gratings 31 and 32 are the same, i.e., perpendicular to the drawing sheet. The dual grating element 27 is inclined with respect to the optical path of the reflection beam 100 by a Bragg angle $\theta b$ in order to heighten the efficiency of the diffraction function thereof.

The grating pitch of the substantially linear diffraction grating 31 formed on the front surface of the dual grating 27 is determined considering the Bragg angle and the polarization characteristic thereof. Also, the grating pitch of the substantially linear diffraction grating 32 formed on the rear surface of the dual grating 27 is arranged either the same as that of the diffraction grating 31 of the front surface or slightly shifted from that of the diffraction grating 31 depending on the distance between the divided two beams, i.e., the beam penetrating substantially straight through the dual grating element 27 and the beam diffracted by the dual grating element 27. Also, each of the linear diffraction gratings 31 and 32 may be either evenly formed to have the same pitch over the entire surface thereof or formed to have a pitch distribution to cope with the astigmatism of the diffracted beam K.

In accordance with the structure mentioned above, the reflection beam emitted from the optical disk is converged by the condenser lens 26 and introduced to the linear diffraction grating 31 formed on the front surface of the dual grating element 27 where the convergent incident beam is divided to two beams, one being a substantially straight beam T and the other being a diffracted beam K. The separated two beams T and K pass through the linear diffraction grating 32 formed on the rear surface of the dual grating element 27 in such a way that the substantially straight beam T again penetrates substantially straight therethrough while the diffracted beam K is again diffracted by the diffraction grating 32. After that, the substantially straight beam T is irradiated to the three-segment light receiving detector element 30 while the diffracted beam K is irradiated to the other three-segment light receiving detector element 29.

In accordance with the above-mentioned arrangement, since the optical path of the diffracted beam K is longer than that of the straight beam T, the convergent point P of the diffracted beam K is positioned in front of the detector surface while the convergent point Q of the straight beam T is positioned behind the detector surface. Note that the distance between the two points P and Q can be determined on the basis of the inclination angle $\theta b$ of the dual grating element 27 and the thickness thereof. Also, with this arrangement, each of the separated two beams has astigmatism. The convergent points of the diffracted beam K and the straight beam T in the direction perpendicular to the drawing sheet are designated by $P_o$ and $Q_o$ in FIG. 1, respectively.

The function of the above-mentioned three-segment light receiving detector elements 29 and 30 is described hereinafter with reference to FIGS. 2a, 2b and 2c. The upper detector element 29 which receives the diffracted beam K has three light receiving segments a, b and c. Similarly, the lower detector element 30 which receives the substantially straight beam T has three light receiving segments d, e and f. The beam spot irradiated on each detector element is depicted by a circle of dash-dot line.

Figure 2A:
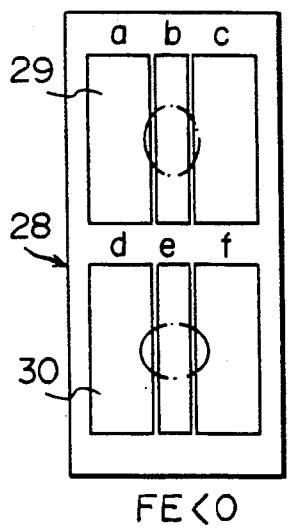
FIGS. 2a, 2b, and 2c are explanatory views for explaining a principle of detecting a focus error signal by an optical detecting element which is installed in the optical system of FIG. 1 and divided to three parts.
Figure 2B:
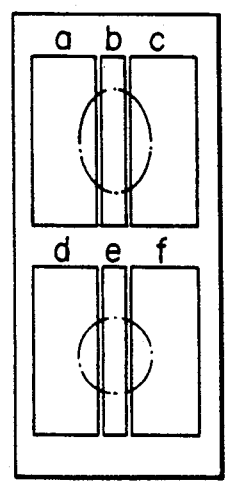

When the focal point is being positioned on the optical disk surface without focus error, the beam spot diameter in the lateral direction on the detector element 29 is equal to that on the detector element 30, as illustrated in FIG. 2b.

The focus error signal FE is represented by the following equation.

$$FE = \{(a+c)-b\} - \{(d+f)-e\} \quad (1)$$

Therefore, if the focal point is being positioned on the optical disk surface as mentioned above, the equation becomes FE=0 so that the focus error signal is not generated.

Figure 2C:
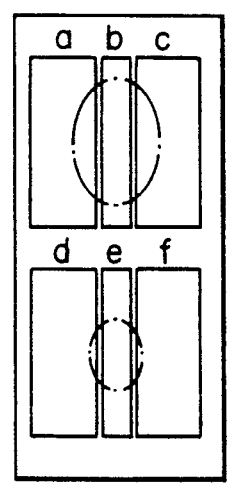

However, when the focal point becomes out of focus and dislocated from the optical disk surface, the spot diameters of the two beams on the respective detector elements 29 and 30 become different from each other, as illustrated in FIGS. 2a and 2c. Therefore, the above-mentioned equation (1) results in FE>0, or FE<0 so that a focus erroe signal is generated which triggers to start the focus correction of the optical system.

As mentioned above, the focus control can be conducted with the use of two three-segment light receiving detector elements 29 and 30.

Also, the dual grating element 27 is arranged to be inclined by the Bragg angle $\theta b$ so that the angle $\theta_1$ of the straight beam T becomes equal to the angle $\theta_2$ of the diffracted beam K (see FIG. 1). In this state, the two beams K and T have a same amount of astigmatism so that the beam spot at the focal point when FE=0 becomes larger than that when there is no astigmatism. Therefore, it becomes easy to arrange and adjust the two light receiving detector elements 29 and 30. In this case, the light receiving detector elements 29 and 30 may either individually installed in the device or mounted on a same support plate so that the arrangement and adustment thereof can be made by shifting and rotating the elements.

On the other hand, the track error signal TE can be represented by the following equation.

$$TE = a - c (\text{or } d - f) \quad (2)$$

Also, when a magneto-optical disk is used instead of the optical disk as the optical information recording medium, the magneto-optical signal MO can be represented by the following equation.

$$MO = (a + b + c) - (d + e + f) \quad (3)$$

Another embodiment of the present invention is described hereinafter with reference to FIGS. 3 and 4a to 4c. This embodiment comprises a dual grating element 27 having a front side and a rear side, one of the two sides being so formed that it functions as a lens in one direction.

Figure 3:
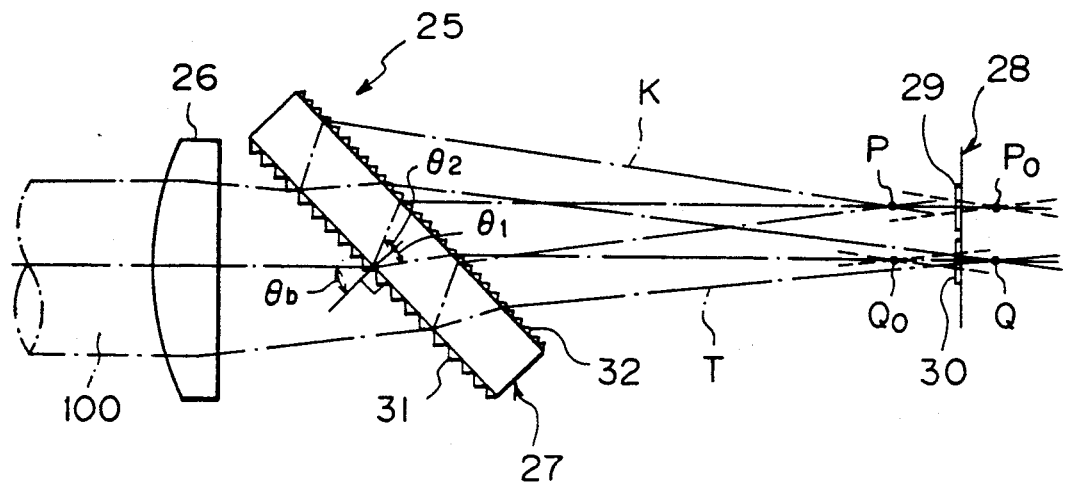
FIG. 3 is a partial constructional side view of another embodiment of the optical information reading and writing device in accordance with the present invention.

Referring to FIG. 3, a dual grating element 27 comprises a diffraction grating 31 having a lens function in one direction formed on one side surface thereof and a substantially linear diffraction grating 32 formed on the other side surface thereof.

The reason for provision of the diffraction grating 31 having a lens function in one direction is as follows.

Figure 4A:
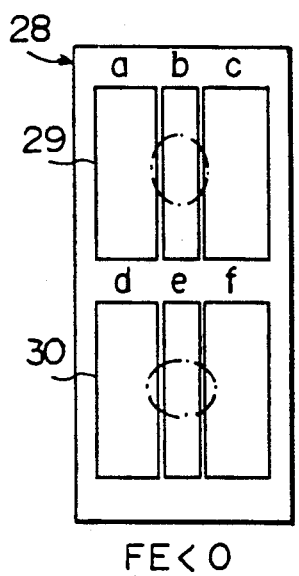
FIGS. 4a, 4b, and 4c are explanatory views for explaining a principle of detecting a focus error signal by an optical detecting element which is installed in the optical system of FIG. 3 and divided to three parts.
Figure 4B:
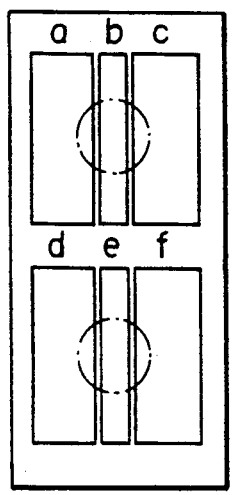
Figure 4C:
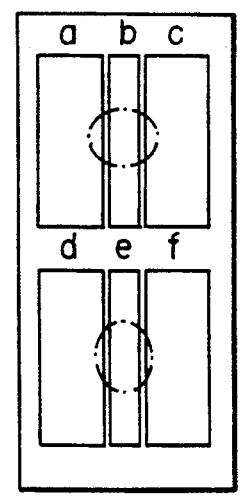

As illustrated in FIG. 3, due to the lens function in one direction of the diffraction grating 31, the convergent point $P_o$ of the diffracted beam K in the direction perpendicular to the drawing sheet is shifted to a position symmetric with respect to the convergent point P from the position depicted in FIG. 1. By this arrangement, as illustrated in FIGS. 4a to 4c, the two beam spots irradiated to the three-segment detector elements 29 and 30 are deformed in the directions perpendicular to each other when FE>0 (FIG. 4c) or FE<0 (FIG. 4a), while the diameters of the two beam spots which are both being circle are the same together when FE=0 (FIG. 4b). Therefore, difference of the optical amount between the beams received by the two detector elements 29 and 30 becomes larger so that it becomes possible to clearly and reliably discriminate the difference, thus heightening the sensitiveness of signal detection compared to the case of the first embodiment illustrated in FIGS. 2a to 2c.

It is to be noted that the position of the diffraction beam K which is diffracted by passing through the dual grating element 27 is shifted according to the wavelength of the beam. However, it is possible to cope with the dislocation of the detector spot by shifting the segments of the detector elements in the same direction as that of the movement of the beam, as can be seen from FIGS. 2a to 2c and 4a to 4c.

Figure 13:
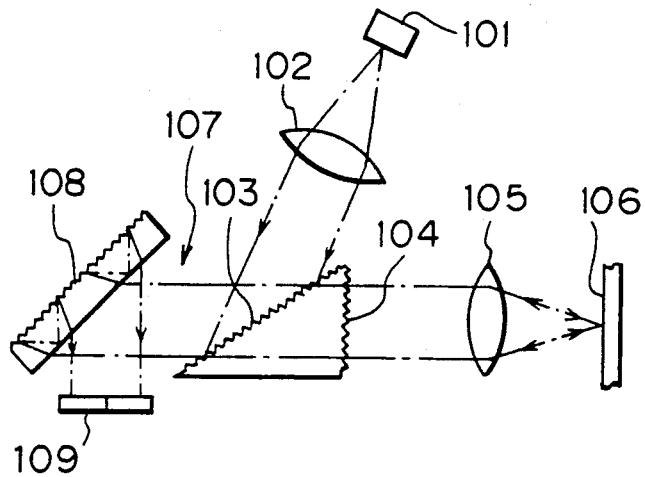
FIG. 13 is a constructional view of another example of the information reading and writing device in accordance with the related art.

FIG. 13 illustrates another example of the optical information reading and writing device.

In accordance with this example of an optical information reading and writing device using a diffraction grating, a laser beam of rays emitted from a semiconductor laser element 101 is made parallel by a collimator lens 102 and irradiated to a polarization beam splitter 103. The diffraction direction of the polarization beam splitter 103 is prearranged in parallel with the direction of the grooves thereof so that the incident light is diffracted toward a quarter-wave plate 104 which converts the light to a circularly polarized light. The circularly polarized light is then converged by an objective lens 105 and irradiated to an optical disk 106 which is a medium for recording optical information data.

Also, a part of reflection rays from the surface of the optical disk 106 propagates back to the quarter-wave plate 104 which converts the light to a linearly polarized light. The linearly polarized light passes through the polarization beam splitter 103 and is guided to a critical angle diffraction grating 108 of an optical information detection system 107.

In this optical information detection system 107, the incident light is diffracted through two times of critical angle diffraction and a total reflection. After that, the diffracted light propagates to a light receiving element 109 which is divided to four parts (segments). Focus error signals and/or track error signals are obtained from the difference of output signals between the four parts of the light receiving element 109.

Figure 14A:
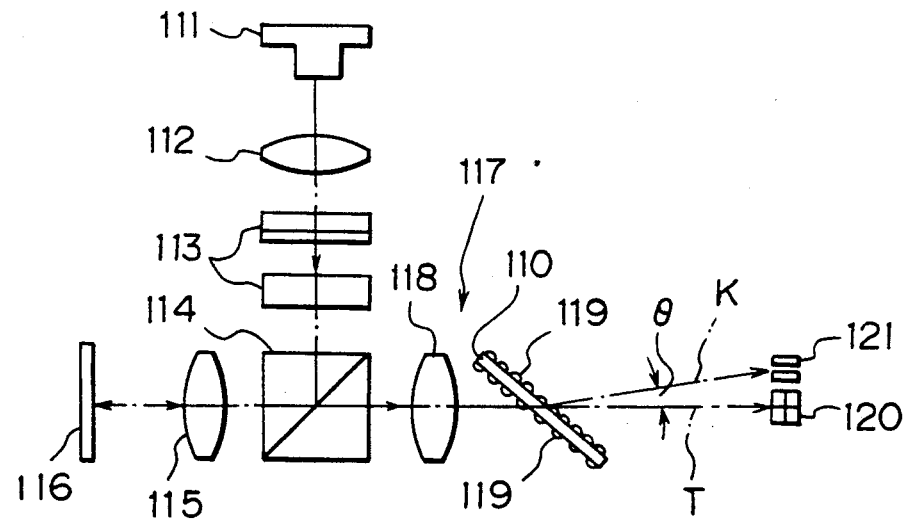
FIG. 14a is a constructional view of still another example of the information reading and writing device in accordance with the related art.
Figure 14B:
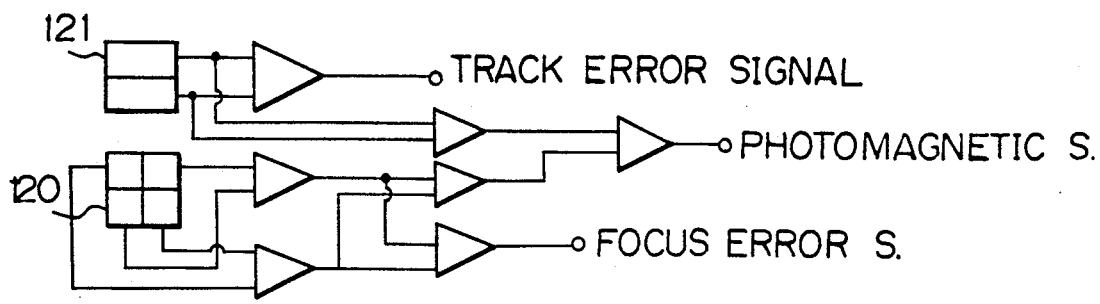

FIGS. 14a and 14b illustrates still another example of the optical information reading and writing device using a diffraction grating means comprising a dual grating. In accordance with this example, a laser beam of rays emitted from a semiconductor laser element 111 is made parallel by a collimator lens 112 and after that passes through two beam shaping prisms 113. The laser beam is then reflected by a beam splitter 114 and converged by an objective lens 115 and irradiated to a magneto-optical disk 116 so that information data is recorded thereon.

Also, a part of the reflection light from the surface of the magneto-optical disk 116 propagates back through the beam splitter 114 and is guided to an optical information detection system 117. In the optical information detection system 117, the reflection beam is converged by a condenser lens 118 and after that passes through the two gratings 119 formed on the upper and lower surfaces of the dual grating element 110 in either way of penetrating substantially straight therethrough or being diffracted thereby.

The zero-order light which penetrates substantially straight through the dual grating element 110 is guided to a light receiving element 120 which is divided to four parts. Whereas the first-order light which is diffracted by the dual grating element 110 is guided to another light receiving element 121 which is divided to two parts.

A magneto-optical signal is obtained from the optical amount difference between the zero-order light and the first-order light. Also, a focus error signal is obtained from the zero-order light using a method of astigmatism. Further, a track error signal is obtained from the first-order light using a push-pull method.

With respect to the first example of the optical information reading and writing device using a diffraction grating means illustrated in FIG. 13 mentioned before, the device can be applied to a write-once optical disk system and a CD (compact disk) system, however, it cannot be applied to a system for detecting signals from a magneto-optical disk. Also, the device of the first example involves a problem that the diffraction angle of the grating changes in response to change of wavelength of the light which passes through the grating.

Also, with regard to the second example of the optical information reading and writing device using a diffraction grating means illustrated in FIGS. 14a and 14b mentioned above, a sufficient accuracy can not be obtained concerning the distance between the zero-order light and the first-order light so that the optical spot is often dislocated, which causes errors of detection and impairs the reliability of the result of signal detection.

The above-mentioned problems can be obviated by an embodiment of the optical information reading and writing device in accordance with the present invention which comprises an optical information detection system for reading information and detecting a track error signal and a focus error signal, comprising: a semiconductor laser element which emits a laser beam to irradiate an optical information recording medium to write information thereon; a condenser lens for converging reflection rays reflected from the optical information recording medium and guiding them to the optical information detection system; a dual grating element disposed on an optical path of the convergent reflection beam and having a first linear diffraction grating having an even pitch formed on one side surface thereof and a second linear diffraction grating having an even pitch formed on the opposed side surface thereof; a first light receiving detector element which is divided to at least three segments and disposed on an optical path of a first-order beam diffracted by the dual grating element; and a second light receiving detector element which is divided to at least three segments and disposed on an optical path of a zero-order beam which passes substantially straight through the dual grating element without being diffracted.

In accordance with the above-mentioned embodiment of the present invention, due to the function of the first linear diffraction grating of even pitch formed on one side of the dual grating element, the reflection beam reflected from the optical information recording medium is divided to two beams, one being a zero-order beam which passes substantially straight through the grating without being diffracted thereby, the other being a first-order beam which is diffracted by the grating. After that, the zero-order beam passes substantially straight through the second diffraction grating formed on the other side of the dual grating element. The first-order beam is further diffracted by the second diffraction grating. The divided two beams are guided to respective light receiving detecor elements so as to detect a magneto-optical signal, a focus error signal and a track error signal.

The above-mentioned embodiment of the present invention is further described hereinafter with reference to FIGS. 8 to 11a, 11b and 11c. Note that the following description refers only to an optical information detection system relating to the present invention without referring to the whole structure of the optical information reading and writing device in which the detection system is installed.

A dual grating element 122 is disposed behind a condenser lens 123. The dual grating element 122 has a shape of plate which has two parallel side surfaces. The dual grating element 122 has a first linear diffraction grating 124 having an even pitch formed on one of the sides thereof facing to the condenser lens 123 and a second linear diffraction grating 125 having an even pitch similarly formed on the other side thereof.

A reflection beam 100 is reflected from a magneto-optical disk (not shown) and converged by the condenser lens 123 of the optical information detection system 126. The dual grating element 122 is disposed on an optical path of the reflection beam 100 after being converged by the condenser lens 123.

Figure 10:
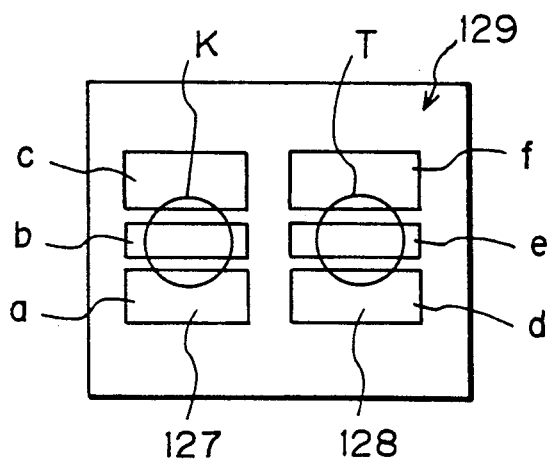
FIG. 10 is a front view of an optical information signal detection element.

The converged reflection beam 100 is divided to a zero-order beam T and a first-order beam K, respectively, as mentioned before, by passing through the dual grating element 122 having the first grating 124 and the second grating 125. A first light receiving detector element 127 is disposed on the optical path of the first-order beam K. The first detector element 127 has three segments a, b and c in its light receiving area as illustrated in FIG. 10. Also, a second light receiving detector element 128 is disposed on the optical path of the zero-order beam T. The second detector element 128 has three segments d, e and f in its light receiving area as illustrated in FIG. 10. The first light receiving detector element 127 and the secong light receiving detector element 128 are mounted on a same support plate and constitute an optical information signal detection device 129. This optical information signal detection device 129 is located at a position between the convergent point P of the first-order beam K and the convergent point Q of the zero-order beam T, i.e., behind the convergent point P and in front of the convergent point Q.

In accordance with the above-mentioned arrangement, the reflection beam 100 emitted from the magneto-optical disk is converged by the condenser lens 123 of the optical information detection system 126. The convergent reflection beam 100 is introduced to the first diffraction grating 124 of the dual grating element 122. The first diffraction grating 124 separates the convergent reflection beam 100 in accordance with the polarization direction of the beam components thereof so that the reflection beam 100 is diveded to two beams, i.e., a zero-order beam T which propagates straight through the grating without being diffracted and a first-order beam K which is diffracted by the grating. The two beams T and K propagate through the dual grating element 122 and pass through the second diffraction grating 125 out of the dual grating element 122. The zero-order beam T penetrates substantially straight through the second diffraction grating 125 without being diffracted thereby. On the other hand, the first-order beam K which is diffracted by the first diffraction grating 124 is again diffracted by the second diffraction grating 125 when passing therethrough.

The first diffraction grating 124 and the second diffraction grating 125 both have no beam convergent function. Therefore, the convergent points of the zero-order beam T and the first-order beam K are determined by the convergent characteristic of the condenser lens 123 so that the two beams T and K converge to points Q and P, respectively. In this case, the convergent point P of the first-order beam K is positioned in front of the convergent point Q of the zero-order beam T, since the optical path length of the diffracted first-order beam K is longer than that of the straight zero-order beam T.

The first-order beam K and the zero-order beam T are irradiated to the first light receiving detector element 127 and the second light receiving detector element 128 of the optical information detection device 129, respectively, which is located at a position between the two convergent points P and Q, as illustrated in FIG. 10. Therefore, the first light receiving detector element 127 receives the first-order beam K in the state of after convergence, whereas the second light receiving detector element 128 receives the zero-order beam T in the state of before convergence.

Figure 11A:
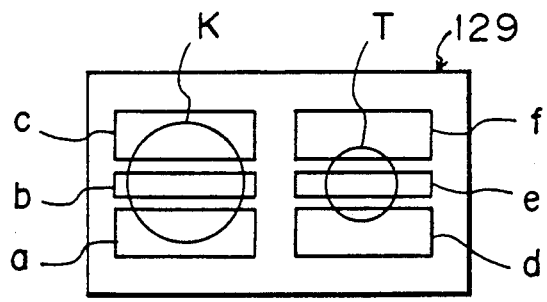
FIGS. 11a, 11b, and 11c are explanatory views for explaining a principle of detecting a focus error signal by the optical information signal detection element of FIG. 10.

A method for detecting a focus error signal, a track error signal and a magneto-optical error signal is described hereinafter with reference to FIGS. 11a to 11c.

Figure 11B:
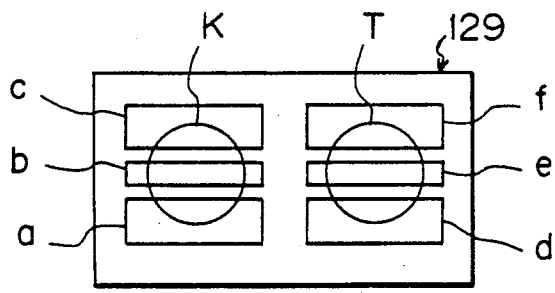
Figure 11C:
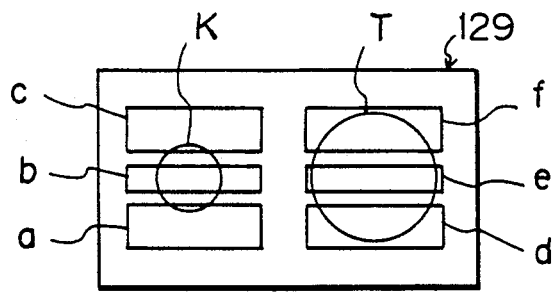

First, with respect to the focus error signal, when the optical irradiation system for scanning the magneto-optical disk is in focus, the spot diameter of the first-order beam K irradiated on the first light receiving detector element 127 is equal to that of the zero-order beam T irradiated on the second light receiving detector element 128, as illustrated in FIG. 11b. Whereas, when the optical scanning system of the magneto-optical disk is out of focus toward the front of the magneto-optical disk, the beam spot diameter of the zero-order beam T becomes smaller than that of the first-order beam K, as illustrated in FIG. 11a. On the other hand, when the optical scanning system of the magneto-optical disk is out of order toward the rear of the magneto-optical disk, the beam spot diameter of the zero-order beam T becomes larger than that of the first-order beam K, as illustrated in FIG. 11c.

As mentioned above, the beam spot diameters of the two beams T and K change in the reversed manner, i.e., one becoming large while the other becoming small, as the focal point of the scanning system of the magneto-optical disk is shifted and dislocated from the disk surface. In accordance with this principle, it is possible to detect the focus error signal by a logical calculation of the following function.

$$(a+c-b)-(d+f-e)$$

Also, the track error signal can be detected from the difference between the optical amount of the beam received by the outer two segments of the light receiving detector element 127 and that of the detector element 128. That is, the track error signal can be obtained by a logical calculation of the following function.

$$(a+d)-(c+f)$$

Also, the magneto-optical signal can be detected from the difference between the optical amount of the first-order beam K and the zero-order beam T received by the first light receiving detector element 127 and the second light receiving detector element 128, respectively. That is, the magneto-optical signal can be obtained by a logical calculation of the following function.

$$(a+b+c)-(d+e+f)$$

As mentioned above, in accordance with the embodiment of the present invention, the reflection beam emitted from the optical information recording medium is introduced to the dual grating element having a first linear diffraction grating and a second linear diffraction grating formed on both sides thereof wherein the reflection beam is divided to a zero-order beam which passes straight through the dual grating element and a first-order beam which is diffracted by the dual grating element and wherein the straight zero-order beam is guided to a first light receiving detector element of the optical information signal detection device, the detector element being divided to at least three segments while the diffracted first-order beam is guided to a second light receiving detector element of the optical information signal detection device, the second detector element being divided to at least three segments.

In accordance with the above-mentioned struture comprising the dual grating element having two linear diffraction gratings and the optical information signal detection device composed of a pair of three-segment light receiving detector elements, even if the spot is shifted in the direction of the segment line (indicated by arrows in FIG. 8), it becomes possible to avoid offset of the detector or generation of noise, which makes it possible to allow to lower the accuracy of manufacturing and assembling the dual grating element without degrading the reliability of the signal detection. Also, it becomes possible to detect the focus error signal, the track error signal and the magneto-optical signal with the use of a common detection device having a simple structure with a small number of component parts, which makes it possible to increase the productivity of the device and lower the cost thereof.

Another embodiment of the present invention is described hereinafter.

This embodiment of the optical information reading and writing device in accordance with the present invention comprises: a semiconductor laser element which emits a laser beam for irradiating an optical information recording medium; an optical information detection system for reading information and detecting a track error signal and a focus error signal from a reflection beam reflected from the optical information recording medium; a condenser lens for converging the reflection beam and guiding it to the optical information detection system; a dual grating element having a first linear diffraction grating of an even pitch formed on one of side surfaces thereof and a second circular diffraction grating in a form of coaxial circles of uneven pitchs formed on the other side surface thereof, the grating element being disposed on an optical path of the reflection beam reflected from the optical information recording medium and converged by the condenser lens; a first light receiving detector element which is disposed on an optical path of a first-order beam diffracted by the dual grating element and divided to at least three segments; and a second light receiving detector element which is disposed on an optical path of a zero-order beam passing substantially straight through the dual grating element without being diffracted thereby and divided to at least three segments.

In accordance with the embodiment of the present invention mentioned above, the second diffraction grating of the dual grating element has an optical converging function due to the structure of coaxial circles of uneven pitches, which makes it possible to increase the allowance of positions of the convergent points of the zero-order beam and the first-order beam in the direction of the optical axis thereof.

Figure 12A:
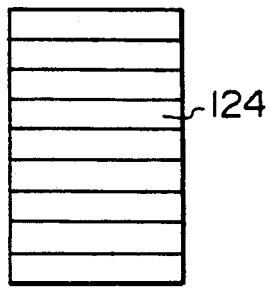
FIG. 12a is a front view of a first diffraction grating formed on one side of a dual grating element in accordance with another example of the present invention.
Figure 12B:
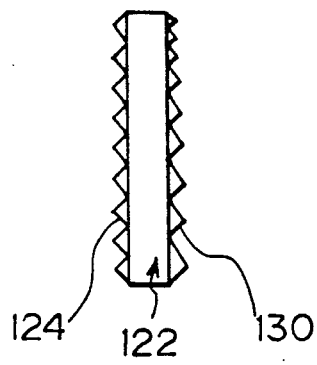
Figure 12C:
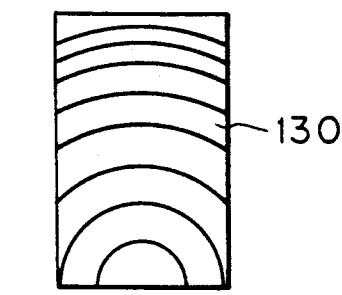
FIG. 12c is a front view of a second diffraction grating formed on the other side of the dual grating element of FIG. 12b.

The above-mentioned embodiment is further described with reference to FIGS. 12a to 12c.

This embodiment is featured in the shape of the diffraction grating formed in one of the side surfaces of the dual grating element. More precisely, in accordance with this embodiment, a dual grating element 122 has a first linear diffraction grating 124 of an even pitch as the afore-mentioned embodiment of FIGS. 8 and 9a to 9c on one of the side surfaces thereof (FIG. 12a). However, unlike the afore-mentioned embodiment, the dual grating element 122 has a featured second diffraction grating 130 on the other side thereof (FIG. 12c). The second diffraction grating is formed in a shape made from a part of a plurality of arcs of coaxial circles arranged at uneven pitches so that the second diffraction grating functions to converge the rays passing therethrough. Due to the arrangement of the second diffraction grating having the optical converging function in addition to the condenser lens 123, the first-order beam K which is diffracted by the dual grating element converges to a point P nearer to the dual grating element, which makes it possible to increase the allowance of the position of the optical information signal detection device 129 comprising the two threesegment light receiving detector elements 127 and 128.

Figure 8:
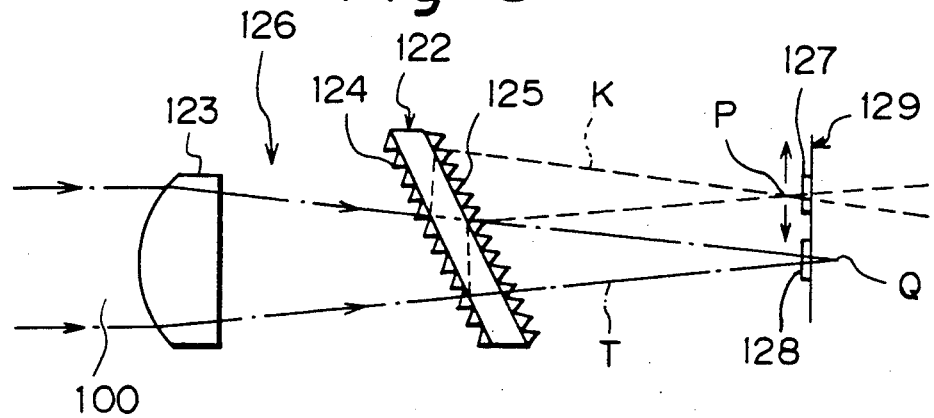
FIG. 8 is a partial constructional view of still another embodiment of an information reading and writing device in accordance with the present invention.
Figure 9A:
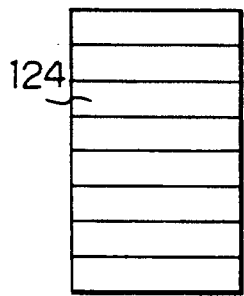
FIG. 9a is a front view of a first diffraction grating formed on one side of a dual grating element in accordance with an example of the present invention.
Figure 9B:
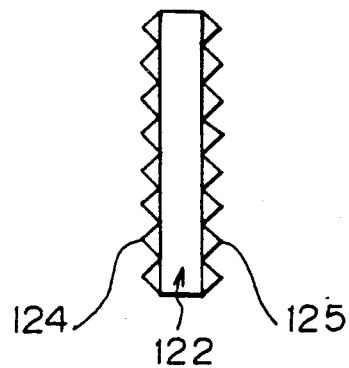
Figure 9C:
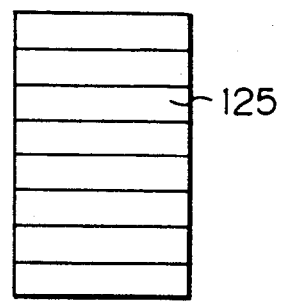
FIG. 9c is a front view of a second diffraction grating formed on the other side of the dual grating element of FIG. 9b.

In the above-mentioned embodiment, if the focul length of the condenser lens 123 is shortened to realize a compact structure of the optical information detection system 126, astigmatism may generated in the zero-order beam T in the structure of FIG. 8 which may impair the reliability of signal detection. Such a problem can be solved by the arrangement of the second diffraction grating 130 having a shape made from curved lines of different pitches so that astigmatism is also generated in the first-order beam K to cancel the astigmatism of the zero-order beam T. As a result, the adverse influence from astigmatism can be minimized which makes it possible to realize a compact optical information signal detection system. However, it is to be noted that in this case an electrical correction of the detected signals have to be considered since if the converging function is applied only to the first-order beam K, the spot diameter thereof changes in a different manner not the same as the zero-order beam T.

As mentioned above, in accordance with the embodiment of the present invention, an arrangement is made in such a way that the dual grating element has a diffraction grating formed on one of the side surfaces thereof which grating has a shape made from curved lines of different pitches so as to function to converge the first-order beam K. Therefore, it becomes possible to easily adjust the positioning of the optical information signal detection device comprising the two light receiving detector elements each divided to three segments.

A further embodiment of the present invention is described hereinafter.

This embodiment provides a novel method for detecting a focus error with the use of the double beam size method in which it becomes possible to use a light source which emits a light the wavelength of which changes without impairing the reliability of the focus error detection.

This embodiment is a method for detecting a positional error of the convergent point of the irradiation beam for scanning an optical information recording medium with respect to the recording surface of the optical information recording medium.

Reflection rays reflected from the optical information recording medium surface are converged by an optical condenser means to make a reflection beam.

The reflection beam is introduced to a diffraction means which comprises two parallel diffraction gratings so as to separate the reflection beam to two beams, namely a straight beam and a diffraction beam. The Bragg condition of grating pitchis satisfied by the diffraction grating which is disposed in the side to which the reflection beam is irradiated.

The reflection beam may be converged by the optical condenser means either before or after the separation of the reflection beam by the diffraction means.

Due to the function of the optical condenser means and the diffraction means, it is possible to obtain two convergent beams which are substantially parallel to each other, the convergent points thereof being dislocated from each other in the direction of propagation of the beams. Note that a state of being parallel means a state in which the principal rays of the two beams are substantially parallel to each other.

A pair of three-segment light receiving detector elements is disposed between the two convergent points of the separated two beams in the direction of the propagation thereof so as to receive the two beams respectively. The focus error can be detected from the outputs of the two light receiving detector elements each of which detects the change of the spot size of the beam irradiated thereto.

The two light receiving detector elements are arranged on a same plane which is substantially perpendicular to the beam propagation direction.

The optical condenser means may be either prepared specially for this particular embodiment of the present invention or substituted by an optical element such as an objective lens which is originally prepared for the optical system of the optical pickup device and commonly used as the condenser means as well as the objective lens.

The diffraction means comprises two side surfaces on each of which a diffraction grating is formed. At least one of the diffraction grating may have a lens function.

Also, it is desirable to arrange the diffraction means so that the grating pitch of the two diffrction gratings is shorter than the wavelength of the incident optical beam irradiated thereto.

Also, it is desirable to arrange the two diffraction gratings so that the grating pitches thereof are the same together at respective beam passing points with respect to a same diffraction beam.

As mentioned above, in accordance with the embodiment of the present invention, the reflection beam emitted from the recording surface of the optical information recording medium is divided to two beams by the diffraction means in such a way that the reflection beam is separated by passing through the two parallel diffraction gratings so that the beam separation function of the diffraction means is not significantly influenced by the change of the wavelength of the beam. Also, it becomes possible to completely neglect the influence of the wavelength change by the arrangement in which the grating pitches of the two diffraction gratings are the same together at the beam passing points with respect to a same diffraction beam passing through the two diffraction gratings.

Also, it becomes possible to detect the magneto-optical signal by the detection system for carrying out the method of the present invention, when the optical information recording medium is a magneto-optical disk, by the arrangement in which the grating pitch of the two diffraction gratings is shorter than the wavelength of the incident beam.

The above-mentioned embodiment of the present invention is further described hereinafter in detail with reference to the drawings.

Figure 15:
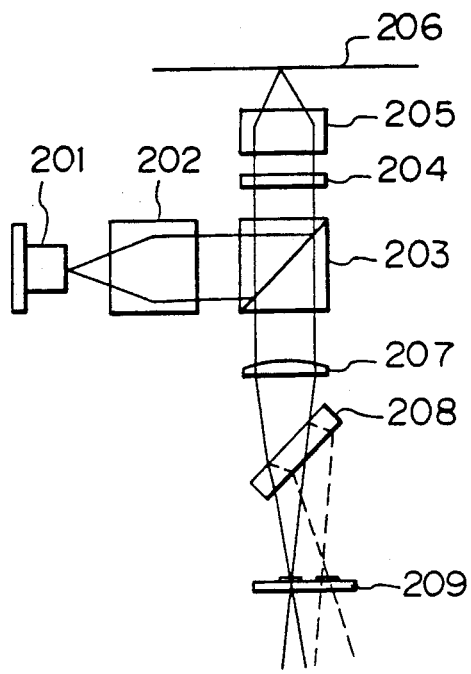
FIG. 15 is a constructional view of an example of an optical pickup device in accordance with the present invention.

FIG. 15 illustrates a main portion of an optical pickup device for optical disk. A laser beam is emitted from a light source comprising a semiconductor laser element 201. The laser beam is paralleled by a collimator lens 202 and reflected by a polarization beam splitter 203. The laser beam further propagates through a quater-wave plate 204 and an objective lens 205 which converges the laser beam on a recording surface 206 of an optical disk.

The focus control of the above-mentioned optical pickup device is conducted with the use of a double beam size method as described below. Also, the track control is conducted by a continuous servo method for the optical disk having a continuous guide groove or a sample servo method for the optical disk not having a continuous guide groove.

The laser beam is reflected by the recording surface 206 of the optical disk. A part of the reflection rays enters into the objective lens 205 and passes straight through the quarterwave plate 204, the polarization beam splitter 203 and a condenser lens 207 as a reflection beam. The condenser lens 207 converges the reflection beam.

The condenser lens 207 constitutes the converging means of this embodiment of the present invention. The convergent reflection beam is then introduced to a diffraction means 208.

The diffraction means 208 separates the incident convergent reflection beam to two beams, namely a straight beam and a diffraction beam. The separated two beams are received by a pair of light receiving detector elements secured to a support plate 209, respectively. Each of the light receiving detector elements has three segments in the detection area thereof.

Figure 16A:
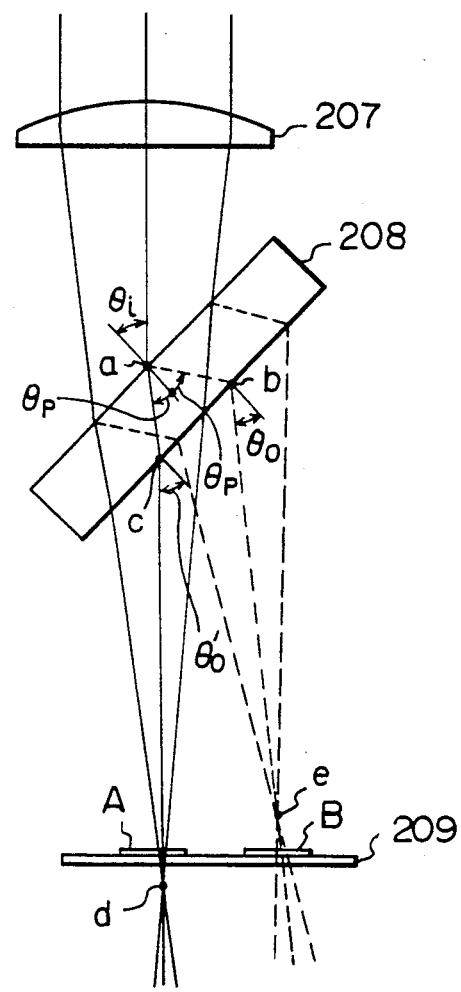
FIG. 16a is an explanatory view for explaining the function of the pickup device of FIG. 15.

FIG. 16a is a partial enlarged view of the optical system of FIG. 15 for explaining the function of the present invention.

The diffraction means 208 in this particular embodiment comprises a dual grating element comprising a transparent parallel plate having diffraction gratings formed on both side surfaces thereof. The dual grating element is arranged in a state of being inclined with respect to the incident beam. The side surface of the dual grating element facing to the condenser lens 207 is referred to as an incident side surface while the side surface in the opposite side thereof is referred to as an emitting side surface hereinafter.

Each of the diffraction gratings formed on the incident side surface and the emitting side surface comprises substantially linear grating grooves arranged in the direction perpendicular to the drawing sheet at a constant grating pitch.

The grating pitch $\Lambda_i$ of the incident side diffraction grating satisfies the Bragg condition which is represented as follows.

$$\Lambda_i = \lambda/(2 \sin \theta_i)$$

wherein $\theta_i$ represents an angle of incidence of the reflection beam irradiated to the dual grating and $\lambda$ represents the wavelength of the incident reflection beam.

Also, the grating pitch $\Lambda_o$ of the emitting side diffraction grating is determined from the above-mentioned grating pitch $\Lambda_i$ of the incident side diffraction grating and the distance between the pair of light receiving detector elements mounted on the support plate 209.

It is to be noted that the above-mentioned grating pitches $\Lambda_i$ and $\Lambda_o$ are the pitches at positions (a) and (b), respectively in FIG. 16a wherein the position (a) represents an incident point of the optical axis of the principal ray of the incident beam and the position (b) represents an emitting point of the principal ray of the diffracted beam propagating out of the grating element 208.

The function of the optical arrangement mentioned above is further described with respect to the principal ray of the convergent reflection beam guided to the diffraction means 208.

As illustrated in FIG. 16a, the reflection beam reflected from the optical disk surface is converged by the condenser lens 207 and introduced to the diffraction grating formed on the incident side surface of the diffraction means 208 at an incidence angle of $\theta_i$. Due to the function of this incident side diffraction grating, the reflection beam is divided to two beams, one being a straight beam which passes substantially straight through the diffraction grating without being diffracted thereby and which is illustrated by solid lines and the other being a diffraction beam which is diffracted by the diffraction grating and which is illustrated in dash lines.

The substantially straight beam is actually refracted by an angle $\theta_p$ of refraction at the incident point (a) on the incident side surface of the diffraction means 208 in accordance with the law of refraction represented by $$\sin \theta_i = n_p \cdot \sin \theta_p$$

wherein $n_p$ represents refractive index of the parallel plate of the diffraction means 208. Also, the the substantially straight beam is againg refracted by an angle $\theta_o'$ of refraction at the emitting point (c) on the emitting side surface of the diffraction means 208. Since the incident side surface and the emitting side surface of the diffraction means are parallel to each other, the equation $$\theta_i = \theta_o'$$

is satisfied. The rays other than the principal ray of the straight beam similarly pass through the diffraction means 208 as illustrated in FIG. 16a and propagete toward the convergent point (d).

On the other hand, with respect to the principal ray of the diffraction beam which is diffracted by the incident side diffraction grating, since the Bragg condition is satisfied, the principal ray of the diffraction beam having an incident angle $\theta_i$ is diffracted by a diffraction angle $\theta_p$ with respect to the normal line of the incident surface in the direction symmetric with the above-mentioned principal ray of the straight beam. As a result, the principal ray is refracted by an angle $2\theta_p$ from the principal ray of the straight beam at the incident point (a) on the incident side surface of the diffraction means 208, as illustrated in FIG. 16a. The diffraction beam is further diffracted at the emitting point (b) on the emitting side surface and propagates out of the diffraction means 208 in a direction of angle $\theta_o$ with respect to the normal line of the emitting side surface of the diffraction means 208. The exit angle $\theta_o$ is determined by the grating pitch of the diffraction grating formed on the emitting side surface of the diffraction means 208. The rays of diffraction beam other than the principal ray propagate through the diffraction means 208 as illustrated in FIG. 16a in dash lines and emit out of the diffraction means 208 toward the convergent point (e).

As mentioned above, it becomes possible to obtain two substantially parallel convergent beams, that is two beams which propagate in the same direction together.

The optical path length (ac) through the diffraction means 208 of the straight beam (solid line) is equal to the optical path length (ab) of the diffraction beam (dash line). And the diffraction beam is folded sideward. Therefore, the convergent point (e) of the diffracted beam is located at a position nearer to the diffraction means 208 than the convergent point (d) of the straight beam in the direction of propagation of the beam.

Figure 16B:
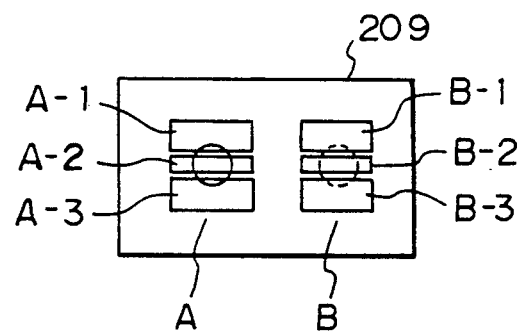
FIG. 16b is another explanatory view for explaining the function of the pickup device of FIG. 15.

The support plate 209 mounts a pair of light receiving detector elements A and B each of which is divided to three segments, as illustrated in FIGS. 16a and 16b. The support plate 209 is disposed between the two convergent points (e) and (d) in the state of being perpendicular to the principal rays of the straight beam and the diffraction beam so that the detector element A receives the straight beam and the detector element B receives the diffraction beam, respectively.

When a focus error arises, the two convergent points (d) and (e) are reversely shifted in the direction of propagation of the convergent beams so that the spot size of one of the beams received by one of the detector elements increases while that of the other beam decreases.

The light receiving detector element A mounted on the support plate 209 is divided to three segments A-1, A-2 and A-3, as illustrated in FIG. 16b. Also, the other light receiving detector element B is divided to three segments B-1, B-2 and B-3, as illustrated in FIG. 16b. When the outputs of the optical detection segments A-1, A-2 and A-3 of the detector element A are represented by a1, a2 and a3, respectively, and similarly the outputs of the optical detection segments B-1, B-2 and B-3 of the detector element B are represented by b1, b2 and b3, respectively, the focus error can be detected from a detection signal of $$\{a2-(a1+a3)\}-\{b2-(b1+b3)\}$$

in the state of being adjusted in focus so that the spot sizes of the two beams are the same. Therefore, the above-mentioned signal can be used as a focus error signal to conduct the focus control of the optical system.

Also, when the optical disk has a track guide groove(s), the track control can be conducted with the use of a track error signal represented by (a1−a3),
(b3−b1) or
(a1−a3)+(b3−b1)

in the state of being adjusted in such a way that the two light receiving detector elements A and B are arranged in the direction corresponding to the direction of the track guide groove.

Also, when the information written in the optical disk is to be read, the information can be read from a reading signal represented by (a1+a2+a3+b1+b2+b3).

In accordance with the structure illustrated in FIG. 16a, the diffraction beam propagates out of the diffraction means 208 at the exit angle $\theta_o$ through the emitting point (b) on the emitting side surface of the diffraction means 208. The exit angle $\theta_o$ can be determined from the following equation $$\sin \theta_o = \sin \theta_i + \lambda\{(1/\Lambda_o)-(1/\Lambda_i)\}$$

wherein $\lambda$ represents the wavelength of the diffraction beam and $\Lambda_o$ and $\Lambda_i$ represent the grating pitches of the diffraction grating of the incident side surface and the emitting side surface of the diffraction means 208, respectively.

In comparison to the above-mentioned optical structure using the dual grating element, when a single hologram (diffraction grating) is used as the diffraction means instead of the dual grating element, the exit angle $\theta_o$ of the diffraction beam can be determined from the following equation $$\sin \theta_o = \sin \theta_i + \lambda/\Lambda_i$$

so that the angle $\theta_o$ largely changes according as the wavelength $\lambda$ changes.

On the other hand, in accordance with the structure of FIG. 16a using the dual grating element as the diffraction means 208, the difference between the incident angle $\theta_i$ and the exit angle $\theta_o$ is determined only from the distance between the light receiving detector elements A and B which are disposed in the optical system arranged in such a way that the principal rays of the straight beam and the diffraction beam propagate substantially in parallel with each other so that the difference between the incident angle $\theta_i$ and the exit angle $\theta_o$ becomes small which makes it possible to minimize the influence of the change of wavelength of the reflection beam.

Besides, it is possible to arrange as $\theta_i = \theta_o$ whereby the influence from the change of the wavelength can be completely obviated. In order to realize the state of $\theta_i = \theta_o$, it is necessary to equalize the grating pitches of the diffraction gratings formed on the incident side surface and the emitting side surface of the dual grating at the respective passing points through which the same ray of the diffraction beam passes.

Also, in accordance with the above-mentioned embodiment of the present invention, it is arranged so that the propagation direction of the straight beam is the same as that of the diffraction beam, whereby the beam spot shapes of the two beams irradiated to the respective light receiving detector elements A and B becomes substantially the same together, which makes it possible to avoid the detection error due to the difference of shapes between the two beams.

Also, astigmatism is generated in both of the straight beam and the diffraction beam divided from the reflection beam by the diffraction means due to the function of the transparent parallel plate of the diffraction means. However, the amount of astigmatism is almost equal to each other, so that the beam spot shapes of the two beams are not differentiated by astigmatism generated in the two beams.

In order to easily adjust the position of the light receiving detector elements A and B having three segments, it is necessary to form an adequate size of beam spot with respect to each of the two beams received by each of the detector elements A and B. This purpose can be achieved by adjusting the distance between the two convergent points (d) and (e) in the direction of propagation of beams, i.e., in the vertical direction in FIG. 16a. Such an adjustment can be conducted by changing the thickness of the parallel plate of the diffraction means 208. The distance between the two convergent points (d) and (e) becomes large according as the thickness of the plate is increased. However, if the diffraction grating plate is excessively thickened, influence of the astigmatism becomes inneglible so that the beam spot shapes of the two beams on the detector element surface become differentiated from each other. Such a problem can be attenuated by an arrangement wherein at least one of the two diffraction gratings of the dual grating element is formed to have a lens function so as to shift the convergent point (e) of the diffraction beam.

An example of the structure of such an arrangement is illustrated in FIG. 17.

In accordance with this example, a diffraction means 208A comprises a diffraction grating which has a positive lens function so that the convergent point (e) of the diffraction beam is shifted toward the diffraction means 208A.

FIG. 18 illustrates still another embodiment of the present invention.

In accordance with this embodiment, a diffraction means 208B is disposed in front of the condenser lens 207 instead of behind thereof as the above-mentioned embodiments. In accordance with such an arrangement, the reflection beam is separated to two beams in advance of being converged so that substantially parallel two beams are introduced to the diffraction means 208B, which makes it possible to even the condition of the incident beams on the diffraction grating surface and increase the functional efficiency of the diffraction means 208B.

A further embodiment of the present invention is described hereinafter with reference again to FIG. 15. In this embodiment, the optical information recording medium comprises a magneto-optical disk.

In accordance with this embodiment of the present invention, the beam splitter 203 comprises a normal beam splitter instead of the polarization beam splitter as is the case of the afore-mentioned embodiment. Also, the quarter-wave plate 204 is omitted from the structure of this embodiment.

The focus error can be detected by the same way as described with reference to FIGS. 15 and 16. Also, the variations of FIGS. 17 and 18 are applicable to this embodiment.

Besides, it becomes possible to obtain the magneto-optical signal from the outputs of the light receiving detector elements A and B, by an arrangement of the diffraction means 208 in such a way that the grating pitch of the diffraction gratings formed on the both side surfaces thereof is less than the wavelength of the beams passing therethrough. This arrangement is further described below with reference to FIGS. 19a and 19b.

Figure 19A:
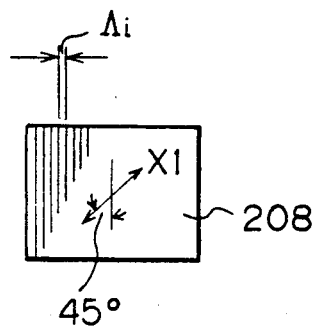
FIGS. 19a and 19b are explanatory views for explaining a focus dislocation detection method in accordance with the present invention applied to a magneto-optical disk.
Figure 19B:
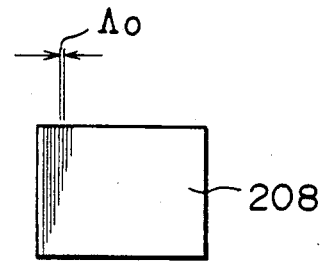

The diffraction grating has a polarization separation characteristic when the grating pitch thereof is smaller than the wavelength λ. FIG. 19a and FIG. 19b illustrate the incident side surface and the emitting side surface of the diffraction means which is a dual grating element, respectively. The grating pitches of the diffraction gratings formed on the both side surfaces are smaller than the wavelength of the incident beam. The diffraction means and the light source are arranged in such a way that an incident beam having a polarization plane inclined by 45 degrees with respect to the direction of the grating is introduced to the incident side surface of the diffraction means. The double-head arrow X1 in FIG. 19a represents the direction of the polarization of the incident beam. Also, the diffraction means is so arranged that the grating direction of the diffraction gratings formed on both side surfaces thereof are the same together. The result of this arrangement is that the optical intensity of the straight beam and that of the diffraction beam become equalized and the polarization direction thereof are perpendicular to each other.

When an information is recorded on the recording surface of the magneto-optical disk, the polarization direction of the reflection beam is rotated due to the Kerr effect. Therefore, the optical intensity of the straight beam and the diffraction beam change according to whether the information is recorded on the magneto-optical disk surface or not. Accordingly, it becomes possible to detect a magneto-optical signal represented by $$(a1+a2+a3)-(b1+b2+b3)$$

from the outputs of the pair of light receiving detector elements A and B.

Figure 20A:
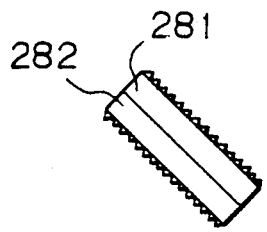
FIG. 20a is a side view of an example of a diffraction grating used in the focuc dislocation detection method in accordance with the present invention.

FIG. 20a illustrates another example of the diffraction means used in the optical reading and writing device in accordance with the present invention. This example of the diffraction means comprises two parallel transparent plates 281 and 282 each of which has a diffraction grating formed on one of the side surfaces thereof, the two plates 281 and 282 being bonded together in such a state that the plane side surfaces without the grating formed thereon are faced to each other.

Figure 20B:
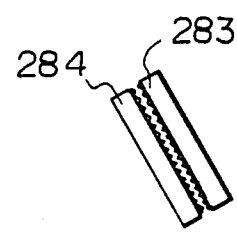
FIG. 20b is a side view of another example of a diffraction grating used in the focus dislocation detection method in accordance with the present invention.

FIG. 20b illustrates still another example of the diffraction means used in the optical reading and writing device in accordance with the present invention. This example of the diffraction means comprises two parallel transparent plates 283 and 284 each of which has a diffraction grating formed on one of the side surfaces thereof, the two plates 283 and 284 being bonded together in such a state that the diffraction grating side surfaces thereof are faced to each other.

It is to be noted that in accordance with the structure of FIG. 20b, it is necessary to arrange the diffraction means so that at least one of the diffraction gratings thereof has a lens function in order to keep an adequate distance between the convergent point (d) of the straight beam and the convergent point (e) of the diffraction beam.

As mentioned above, the embodiment of the present invention comprises a magneto-optical disk as the optical information recording medium and the magneto-optical signal is detected with the use of the diffraction means. The grating pitch of the diffraction grating of such a structure is minute in the order of submicron. Such a minute diffraction grating may be produced by a double-beam interference exposure method.

Figure 21A:
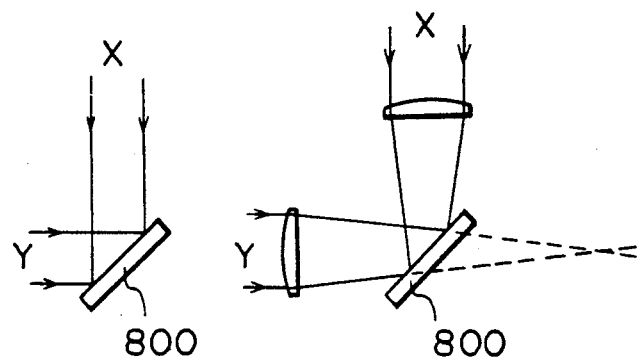
FIGS. 21a, 21b, and 21c are explanatory views for explaining a process for producing a diffraction grating used in the focus dislocation detection method in accordance with the present invention.
Figure 21B:
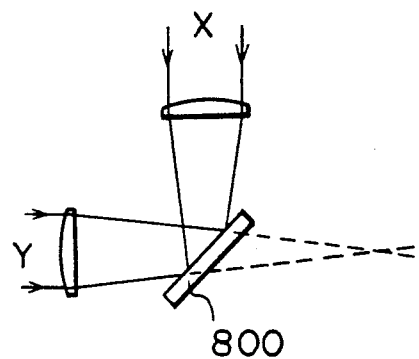
Figure 21C:
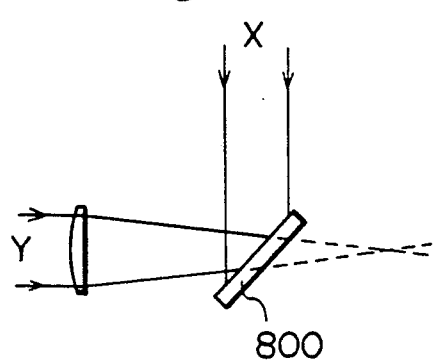

FIGS. 21a to 21c illustrate three examples of the double-beam interference exposure method for producing the diffraction grating of minute pitch.

Numeral 800 designates a substrate plate on which a photoresist is coated. Two beams X and Y are irradiated to the photoresist layer of the substrate plate 800 at a predetermined angle so as to interfere the two beams with each other so that a desirable grating pattern is formed on the substrate plate 800. In accordance with the exposure method of FIGS. 21b and 21c, the produced diffraction grating has a lens function.

After the exposure process, the grating pattern is developed by an alkaline developer. After that, an electrode for electroforming process is formed by sputtering nickel (Ni). After that, an uneven surface corresponding to the exposed grating pattern is formed on the nickel layer by the electroforming process and the nickel layer is secured to a base plate to constitute a stamper.

On the other hand, a parallel plane plate made from such as acrylic material is prepared and a 2P resin layer is formed on one of the side surfaces of the plate. The grating pattern is transferred to the resin layer of the plate from the stamper.

By repeating the above-mentioned process for the other side surface of the acrylic plate, a dual grating element can be obtained.

Or otherwise, a dual grating element can be obtained by bonding two plates each having a diffraction grating on one of its side surfaces as illustrated in FIG. 20a or FIG. 20b.

As mentioned above, the embodiments of the present invention provide a novel method for detecting a focus error. The focus error detection method in accordance with the above-mentioned embodiments of the present invention makes it possible to attenuate the problems of prior art and increase the reliability and accuracy of detecting the focus error by minimizing the adverse influence of change of the wavelength.

A further embodiment of the present invention is described hereinafter.

This embodiment provides a novel method for detecting a focus error with the use of the double beam size method in which it becomes possible to use a light source which emits a light the wavelength of which changes without impairing the reliability of the focus error detection and widen the focus range of the optical information reading and writing device.

This embodiment is a method for detecting a positional error of the convergent point of the irradiation beam for scanning an optical information recording medium with respect to the recording surface of the optical information recording medium.

Reflection rays reflected from the optical information recording medium surface are converged by an optical condenser means to make a reflection beam.

The reflection beam is introduced to a diffraction means which comprises two parallel diffraction gratings so as to separate the reflection beam to two beams, namely a straight beam and a diffraction beam. The Bragg condition of grating pitch is satisfied by the diffraction grating which is disposed in the side to which the reflection beam is irradiated. The two diffraction gratings are formed on both side surfaces of a transparent parallel plate having a refractive index of other than 1. Astigmatism is generated in both of the straight beam and the diffraction beam due to the function of the diffraction means.

Due to the function of the optical condenser means and the diffraction means, it is possible to obtain two convergent beams which are substantially parallel to each other, the convergent points thereof being dislocated from each other in the direction of propagation of the beams. Note that a state of being parallel means a state in which the principal rays of the two beams are substantially parallel to each other.

The straight beam and the diffraction beam are both received by respective light receiving detector elements. The principal ray of each beam is substantially perpendicular to the detection surface of each light receiving detector element. The two light receiving detector elements constitute a pair of detector elements of an optical detector system. The detection area of each detector element is divided to three segments by parallel divisional lines.

The pair of light receiving detector elements are arranged in such a way that the divisional lines of one of the detector elements are in parallel with the arrangement line of the two elements and that the divisional lines of the other detector element are perpendicular to the arrangement line along which the two elements are disposed. The two light receiving detector elements are disposed on a same plane at a position between the two best convergent points of the respective beams with respect to the direction of propagation of the beams.

The change of beam spot shape of each beam irradiated to each detector element is detected from the output thereof so that the dislocation of the focal point of the irradiation beam is detected.

The optical condenser means may be either prepared specially for this particular embodiment of the present invention or substituted by an optical element such as an objective lens which is originally prepared for the optical system of the optical pickup device and commonly used as the condenser means as well as the objective lens.

Also, it is desirable to arrange the diffraction means so that the grating pitch of the two diffrction gratings is shorter than the wavelength of the incident optical beam irradiated thereto.

Also, it is desirable to arrange the two diffraction gratings so that the grating pitches thereof are the same together at respective beam passing points with respect to a same diffraction beam.

As mentioned above, in accordance with the embodiment of the present invention, the reflection beam emitted from the recording surface of the optical information recording medium is divided to two beams by the diffraction means in such a way that the reflection beam is separated by passing through the two parallel diffraction gratings so that the beam separation function of the diffraction means is not significantly influenced by the change of the wavelength of the beam. Also, it becomes possible to completely neglect the influence of the wavelength change by the arrangement in which the grating pitches of the two diffraction gratings are the same together at the beam passing points with respect to a same diffraction beam passing through the two diffraction gratings.

Also, the focus range of the optical system is widened since each of the separated two beams has astigmatism.

Also, it becomes possible to detect the magneto-optical signal by the detection system for carrying out the method of the present invention, when the optical information recording medium is a magneto-optical disk, by the arrangement in which the grating pitch of the two diffraction gratings is shorter than the wavelength of the incident beam.

The above-mentioned embodiment of the present invention is further described hereinafter in detail with reference to the drawings.

FIG. 22 illustrates a main portion of an optical pickup device for optical disk. A laser beam is emitted from a light source comprising a semiconductor laser element 301. The divergent laser beam is introduced to a polarization beam splitter 302 and reflected thereby. The laser beam is then paralleled by a collimator lens 303. The laser beam further propagates through a quarter-wave plate 304 and an objective lens 305 which converges the laser beam on a recording surface 306 of an optical disk.

The focus control of the above-mentioned optical pickup device is conducted as described below. Also, the track control is conducted by a continuous servo method for the optical disk having a continuous guide groove or a sample servo method for the optical disk not having a continuous guide groove.

The laser beam is reflected by the recording surface 306 of the optical disk. A part of the reflection rays enters into the objective lens 305 and passes therethrough and further propagates through the quarter-wave plate 304 and the condenser lens 303 which converges the reflection beam. The condenser lens 303 functions as an optical convergent means for the reflection rays as well as functions as a collimator lens for the laser beam emitted from the semiconductor laser element 301, in this particular embodiment.

The convergent reflection beam is then introduced to a diffraction means 307.

The diffraction means 307 separates the incident convergent reflection beam to two beams, namely a straight beam and a diffraction beam. The separated two beams are received by a pair of light receiving detector elements secured on a support plate 308, respectively. Each of the light receiving detector elements has three segments in the detection area thereof.

FIG. 23a is a partial enlarged view of the featured portion of the optical system of FIG. 22 for explaining the function of the present invention.

The diffraction means 307 in this particular embodiment comprises a dual grating element comprising a transparent parallel plate having diffraction gratings formed on both side surfaces thereof. The refractive index of the dual grating plate is other than one (not equal to 1). The dual grating element is arranged in a state of being inclined with respect to the incident beam. The side surface of the dual grating element 307 facing to the polarization beam splitter 302 is referred to as an incident side surface while the side surface in the opposite side thereof is referred to as an emitting side surface hereinafter.

Each of the diffraction gratings formed on the incident side surface and the emitting side surface comprises substantially linear grating grooves arranged in the direction perpendicular to the drawing sheet at a constant grating pitch.

The grating pitch $\Lambda_i$ of the incident side diffraction grating satisfies the Bragg condition which is represented as follows.

$$\Lambda_i = \lambda/(2 \sin \theta_i)$$

wherein $\theta_i$ represents an angle of incidence of the reflection beam irradiated to the dual grating and $\lambda$ represents the wavelength of the incident reflection beam.

Also, the grating pitch $\Lambda_o$ of the emitting side diffraction grating is determined from the above-mentioned grating pitch $\Lambda_i$ of the incident side diffraction grating and the distance between the pair of light receiving detector elements mounted on the support plate 308.

It is to be noted that the above-mentioned grating pitches $\Lambda_i$ and $\Lambda_o$ are the pitches at positions (a) and (b), respectively in FIG. 23a wherein the position (a) represents an incident point of the optical axis of the principal ray of the incident beam and the position (b) represents an emitting point of the principal ray of the diffracted beam propagating out of the grating element 307.

The function of the optical arrangement mentioned above is further described with respect to the principal ray of the convergent reflection beam guided to the diffraction means 307.

As illustrated in FIG. 23a, the reflection beam reflected from the optical disk surface is converged by the condenser lens 303 and introduced to the diffraction grating formed on the incident side surface of the diffraction means 307 at an incidence angle of $\theta_i$. Due to the function of this incident side diffraction grating, the reflection beam is divided to two beams, one being a straight beam which passes substantially straight through the diffraction grating without being diffracted thereby and which is illustrated by solid lines and the other being a diffraction beam which is diffracted by the diffraction grating and which is illustrated in dash lines.

The substantially straight beam is actually refracted by an angle $\theta_p$ of refraction at the incident point (a) on the incident side surface of the diffraction means 307 in accordance with the law of refraction represented by $$\sin \theta_i = n_p \sin \theta_p$$

wherein $n_p$ ($n_p \neq 1$) represents refractive index of the parallel plate of the diffraction means 307. Also, the the substantially straight beam is agaiing refracted by an angle $\theta_o'$ of refraction at the emitting point (c) on the emitting side surface of the diffraction means 307. Since the incident side surface and the emitting side surface of the diffraction means are parallel to each other, the equation $$\theta_i = \theta_o'$$

is satisfied. The rays other than the principal ray of the straight beam are similarly refracted by the diffraction means 307 and pass through the diffraction means 307 as illustrated in FIG. 23a.

On the other hand, with respect to the principal ray of the diffraction beam which is diffracted by the incident side diffraction grating, since the Bragg condition is satisfied, the principal ray of the diffraction beam having an incident angle $\theta_i$ is diffracted by a diffraction angle $\theta_p$ with respect to the normal line of the incident surface in the direction symmetric with the above-mentioned principal ray of the straight beam. As a result, the principal ray is refracted by an angle $2\theta_p$ from the principal ray of the straight beam at the incident point (a) on the incident side surface of the diffraction means 307, as illustrated in FIG. 23a. The diffraction beam is further diffracted at the emitting point (b) on the emitting side surface and propagates out of the diffraction means 307 in a direction of angle $\theta_o$ with respect to the normal line of the emitting side surface of the diffraction means 307. The exit angle $\theta_o$ is determined by the grating pitch of the diffraction grating formed on the emitting side surface of the diffraction means 307. The rays of diffraction beam other than the principal ray propagate through the diffraction means 307 as illustrated in FIG. 23a in dash lines and emit out of the diffraction means 307.

As mentioned above, it becomes possible to obtain two substantially parallel convergent beams, that is two beams which propagate in the same direction together.

The optical path length (ac) through the diffraction means 307 of the straight beam is equal to the optical path length (ab) of the diffraction beam. Therefore, astigmatism of the straight beam is substantially equal to that of the diffraction beam.

In FIG. 23a, references $d_1$ and $d_2$ represent the convergent points of the straight beam with respect to the two directions perpendicular to each other and reference $d_0$ represents the best focus point of the straight beam. Similarly, references $e_1$ and $e_2$ represent the convergent points of the diffraction beam with respect to the two directions perpendicular to each other and reference $e_0$ represents the best focus point of the diffraction beam.

Since the diffraction beam is largely folded sideward in comparison to the straight beam, the convergent points $e_1$ and $e_2$ and the best focus point $e_0$ of the diffraction beam are located at positions nearer to the diffraction means 307 than corresponding convergent points $d_1$ and $d_2$ and the best focus point $d_0$ of the straight beam in the direction of propagation of the beam. It is to be noted that at the convergent points $d_1$ and $e_1$, the straight beam and the diffraction beam both form a line image which is perpendicular to the drawing sheet of FIG. 23a. Whereas, at the convergent points $d_2$ and $e_2$, the straight beam and the diffraction beam both form a line image which is parallel to the drawing sheet of FIG. 23a. Also, at the best focus points $d_0$ and $e_0$, the sectional shape of each of the two beams become substantially circle, as illustrated in FIG. 23a.

The support plate 308 mounts a pair of light receiving detector elements A and B each of which is divided to three segments, as illustrated in FIGS. 23a and 23b. The support plate 308 is disposed between the two best focus points $d_0$ and $e_0$ in the state of being perpendicular to the principal rays of the straight beam and the diffraction beam so that the detector element A receives the straight beam and the detector element B receives the diffraction beam, respectively.

When a focus error arises, the two best focus points $d_0$ and $e_0$ are shifted toward the same direction together along the direction of the propagation thereof so that the spot shape of each beam received by each detector element changes.

The light receiving detector element A mounted on the support plate 308 is divided to three segments A-1, A-2 and A-3, as illustrated in FIG. 23b. Also, the other light receiving detector element B is divided to three segments B-1, B-2 and B-3, as illustrated in FIG. 23b. The divisional lines of the light receiving element A are perpendicular to the drawing sheet in FIG. 23a, while the divisional lines of the light receiving element B are parallel to the drawing sheet in FIG. 23a, i.e., parallel to arrangement line of the two light receiving elements A and B.

When the outputs of the optical detection segments A-1, A-2 and A-3 of the detector element A are represented by a1, a2 and a3, respectively, and similarly the outputs of the optical detection segments B-1, B-2 and B-3 of the detector element B are represented by b1, b2 and b3, respectively, the focus error $F_0$ can be detected from the following equation.

$$F_0 = \{a2 - (a1 + a3)\} - \{b2 - (b1 + b3)\}$$

FIG. 24b represents the state of being adjusted in focus so that the spot sizes of the two beams are the same. FIG. 24a represents a state of being out of focus in which the focal point is dislocated behind the optical disk so that the spot shapes of the two beams are deformed as illustrated in FIG. 24a from the state of FIG. 24b. FIG. 24c represents a state of being out of focus in which the focal point is dislocated in front of the optical disk so that the spot shapes of the two beams are deformed as illustrated in FIG. 24c from the state of FIG. 24b.

The above-mentioned signal $F_0$ can be used as a focus error signal to conduct the focus control of the optical system.

Also, when the optical disk has a track guide groove(s), the track control can be conducted with the use of a track error signal represented by (a1 − a3),
(b3 − b1) or
(a1 − a3) + (b3 − b1)

in the state of being adjusted in such a way that the two light receiving detector elements A and B are arranged in the direction corresponding to the direction of the track guide groove.

Also, when the information written in the optical disk is to be read, the information can be read from a reading signal represented by (a1 + a2 + a3 + b1 + b2 + b3).

In accordance with the structure illustrated in FIG. 23a, the diffraction beam propagates out of the diffraction means 307 at the exit angle $\theta_0$ through the emitting point (b) on the emitting side surface of the diffraction means 307. The exit angle $\theta_0$ can be determined from the following equation $$\sin\theta_0 = \sin\theta_i + \lambda\{(1/\Lambda_0) - (1/\Lambda_i)\}$$

wherein $\lambda$ represents the wavelength of the diffraction beam and $\Lambda_0$ and $\Lambda_i$ represent the grating pitches of the diffraction grating of the incident side surface and the emitting side surface of the diffraction means 307, respectively.

In comparison to the above-mentioned optical structure using the dual grating element, when a single hologram (diffraction grating) is used as the diffraction means instead of the dual grating element, the exit angle $\theta_0$ of the diffraction beam can be determined from the following equation $$\sin\theta_0 = \sin\theta_i + \lambda/\Lambda_i$$

so that the angle $\theta_0$ largely changes according as the wavelength $\lambda$ changes.

On the other hand, in accordance with the structure of FIG. 23a using the dual grating element as the diffraction means 307, the difference between the incident angle $\theta_i$ and the exit angle $\theta_0$ is determined only from the distance between the light receiving detector elements A and B which are disposed in the optical system arranged in such a way that the principal rays of the straight beam and the diffraction beam propagate substantially in parallel with each other so that the difference between the incident angle $\theta_i$ and the exit angle $\theta_0$ becomes small which makes it possible to minimize the influence of the change of wavelength of the reflection beam.

Besides, it is possible to arrange as $\theta_i = \theta_0$ whereby the influence from the change of the wavelength can be completely obviated. In order to realize the state of $\theta_i = \theta_0$, it is necessary to equalize the grating pitches of the diffraction gratings formed on the incident side surface and the emitting side surface of the dual grating at the respective passing points through which a same ray of the diffraction beam passes.

Also, in accordance with the above-mentioned embodiment of the present invention, it becomes possible to widen the focus range of the optical pickup device as described below.

That is, with reference again to FIG. 23a, if the separated straight beam and the diffraction beam do not have astigmatism, the two beams converge to the best focus points $d_0$ and $e_0$, respectively, so that the focus range is defined by the distance between the two best focus points $d_0$ and $e_0$ in the direction of propagation of the beams.

On the other hand, in accordance with the above-mentioned embodiment of the present invention, the straight beam and the diffraction beam bothe have astigmatism so that the focus range is defined by the distance between the convergent point $d_1$ of the straight beam and the convergent point $e_2$ of the diffraction beam. As a result, the focus range is widened. Besides, it is not necessary to enlarge the two light receiving detector elements A and B in spite of that the focus range is widened.

A further embodiment of the present invention is described hereinafter with reference again to FIG. 22. In this embodiment, the optical information recording medium comprises a magneto-optical disk.

In accordance with this embodiment of the present invention, the beam splitter 302 comprises a normal beam splitter instead of the polarization beam splitter as is the case of the afore-mentioned embodiment. Also, the quarter-wave plate 304 is omitted from the structure of this embodiment.

The focus error can be detected by the same way as described with reference to FIGS. 22, 23a to 23c and 24a to 24c.

Besides, it becomes possible to obtain the magneto-optical signal from the outputs of the light receiving detector elements A and B, by an arrangement of the diffraction means 307 in such a way that the grating pitch of the diffraction gratings formed on the both side surfaces thereof is less than the wavelength of the beams passing therethrough. This arrangement is further described below with reference to FIG. 25.

The diffraction grating has a polarization separation characteristic when the grating pitch thereof is smaller than the wavelength $\lambda$. FIG. 25 illustrates a diffraction means 308A composed of a dual grating element having diffraction gratings formed on the incident side surface and the emitting side surface thereof, respectively. The grating pitches of the diffraction gratings formed on the both side surfaces are smaller than the wavelength of the incident beam. The diffraction means and the light source are arranged in such a way that an incident beam having a polarization plane inclined by 45 degrees with respect to the direction of the grating is introduced to the incident side surface of the diffraction means, as illustrated in FIG. 25. The double-head arrow X1 in FIG. 25 represents the direction of the polarization of the incident beam. Also, the diffraction means is so arranged that the grating direction of the diffraction gratings formed on both side surfaces thereof are the same together. The result of this arrangement is that the optical intensity of the straight beam and that of the diffraction beam become equalized and the polarization direction thereof are perpendicular to each other.

When an information is recorded on the recording surface of the magneto-optical disk, the polarization direction of the reflection beam is rotated due to the Karr effect. Therefore, the optical intensity of the straight beam and the diffraction beam change according to whether the information is recorded on the magneto-optical disk surface or not. Accordingly, it becomes possible to detect a magneto-optical signal represented by $$(a1+a2+a3)-(b1+b2+b3)$$

from the outputs of the pair of light receiving detector elements A and B.

As mentioned above, the embodiment of the present invention comprises a magneto-optical disk as the optical information recording medium and the magneto-optical signal is detected with the use of the diffraction means. The grating pitch of the diffraction grating of such a structure is minute in the order of submicron. Such a minute diffraction grating may be produced by a doublebeam interference exposure method.

A prototype of the disk is formed by the double-beam interference exposure method to prepare a stamper. A 2P resin layer is formed on both side surfaces of a parallel plate made from a material such as acrylic material. The diffraction grating pattern is transferred to the resin layer on each side surface of the acrylic plate from a predetermined stamper. Thereby, a dual diffraction grating can be produced.

Or otherwise, it is possible to form a dual grating element by bonding two parallel plane plates together each of which plate has a predetermined diffraction grating formed on the outer side surface thereof.

As mentioned above, the embodiments of the present invention provide a novel method for detecting a focus error. The focus error detection method in accordance with the above-mentioned embodiments of the present invention makes it possible to attenuate the problems of prior art and increase the reliability and accuracy of detecting the focus error by minimizing the adverse influence of change of the wavelength.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical information reading and writing device comprising:
   a laser source which emits a laser beam for irradiating an optical information recording medium to record an information therein; and
   an optical signal detection system which receives a reflection beam reflected from said optical information recording medium and controls position of said optical information recording medium, said optical signal detection system comprising:
   a condenser lens which is disposed on an optical path of said reflection beam passing through said optical signal detection system and converges said reflection beam;
   a dual grating element which has substantially linear diffraction gratings formed on both side surfaces thereof and divides said reflection beam converged by said condenser lens to two beams, one being a diffraction beam which is diffracted by said dual grating element and the other being a straight beam which passes substantially straight through said dual grating element without being diffracted thereby; and
   two light receiving detector elements for detecting said diffraction beam and said straight beam, respectively, each of which light receiving detector elements is divided to three segments and disposed on a same plane as the other light receiving detector element.

2. An optical information reading and writing device comprising:

a laser source which emits a laser beam for irradiating an optical information recording medium to record an information therein; and an optical signal detection system which receives a reflection beam reflected from said optical information recording medium and controls position of said optical information recording medium, said optical signal detection system comprising:

a condenser lens which is disposed on an optical path of said reflection beam passing through said optical signal detection system and converges said reflection beam;

a dual grating element which has a substantially linear diffraction grating formed on one of both side surfaces thereof and a diffraction grating having a lens function in one direction formed on the other side surface thereof and which dual grating element divides said reflection beam converged by said condenser lens to two beams, one being a diffraction beam which is diffracted by said dual grating element and the other being a straight beam which passes substantially straight through said dual grating element without being diffracted thereby; and two light receiving detector elements for detecting said diffraction beam and said straight beam, respectively, each of which light receiving detector elements is divided to three segments and disposed on a same plane as the other light receiving detector element.

3. An optical information reading and writing device according to claim 1, wherein said dual grating element is disposed on said optical path of said reflection beam in a state of being inclined with respect to an optical axis of said reflection beam.

4. An optical information reading and writing device comprising:

a laser source which emits a laser beam for irradiating an optical information recording medium to record an information therein; and an optical information detection system which receives a reflection beam reflected from said optical information recording medium so as to read the information recorded therein and detect a track error signal and a focus error signal from said reflection beam, said optical information detection system comprising:

a condenser lens which is disposed on an optical path of said reflection beam passing through said optical information detection system and converges said reflection beam;

a dual grating element which has a first diffraction grating composed of a substantially linear diffraction grating having an even pitch formed on one of both side surfaces thereof and a second diffraction grating composed of a substantially linear diffraction grating having an even pitch formed on the other side surface thereof;

a first light receiving detector element which is divided to at least three segments and disposed on an optical path of a first-order beam diffracted by said dual grating element; and a second light receiving detector element which is divided to at least three segments and disposed on an optical path of a zero-order beam passing substantially straight through said dual grating element without being diffracted thereby.

5. An optical information reading and writing device comprising:

a laser source which emits a laser beam for irradiating an optical information recording medium to record an information therein; and an optical information detection system which receives a reflection beam reflected from said optical information recording medium so as to read the information recorded therein and detect a track error signal and a focus error signal from said reflection beam, said optical information detection system comprising:

a condenser lens which is disposed on an optical path of said reflection beam passing through said optical information detection system and converges said reflection beam;

a dual grating plate element which has a first diffraction grating composed of a substantially linear diffraction grating having an even pitch formed on one of both side surfaces thereof and a second diffraction grating having a shape made from a plurality of arcs of coaxial circles arranged at uneven pitches formed on the other side surface thereof;

a first light receiving detector element which is divided to at least three segments and disposed on an optical path of a first-order beam diffracted by said dual grating element; and a second light receiving detector element which is divided to at least three segments and disposed on an optical path of a zero-order beam passing substantially straight through said dual grating element without being diffracted thereby.

6. A focus error detection method for detecting dislocation between a convergent point of an irradiation beam for irradiating an optical information recording medium and a recording surface of said optical information recording medium irradiated by said beam for an optical information reading and writing device, the method comprising steps of:

(a) converging reflection rays reflected from said recording surface of said optical information recording medium through a condenser means to form a convergent reflection beam;

(b) separating said reflection beam to two convergent beams substantially in parallel to each other and each having a convergent point, the two convergent points of said two beams being dislocated from each other in a direction of propagation of said beams, by passing through a diffraction means having two parallel side surfaces on each of which a diffraction grating is formed in such a manner that said diffraction grating formed on an incident side surface has a grating pitch which satisfies Bragg condition so that said reflection beam incident to said diffraction grating is separated to a straight beam which passes substantially straight through said diffraction grating without being diffracted and a diffraction beam which is diffracted thereby; and (c) detecting said dislocation from outputs of a pair of light receiving three-segment detector elements which are disposed on a same plane perpendicular to said direction of propagation of said beams and located between said two convergent points, each of said detector elements receiving one of said separated two beams to detect change of a beam spot size thereof.

7. A focus error detection method according to claim 6, wherein at least one of said two diffraction gratings has a lens function.

8. A focus error detection method according to claim 6, wherein both of said two diffraction gratings have a grating pitch which is shorter than a wavelength of said incident beam.

9. A focus error detection method for detecting dislocation between a convergent point of an irradiation beam for irradiating an optical information recording medium and a recording surface of said optical information recording medium irradiated by said beam for an optical information reading and writing device, the method comprising steps of:

(a) converging reflection rays reflected from said recording surface of said optical information recording medium through a condenser means to form a convergent reflection beam;

(b) separating said reflection beam to two convergent beams substantially in parallel to each other and each having a best focus point, the two best focus points of said two beams being dislocated from each other in a direction of propagation of said beams, by passing through a diffraction means comprising a transparent plate which has a refractive index of other than 1, said plate having two parallel side surfaces on each of which a diffraction grating is formed in such a manner that said diffraction grating formed on an incident side surface has a grating pitch which satisfies Bragg condition so that said reflection beam incident to said diffraction grating is separeted to a straight beam which passes substantially straight through said diffraction grating without being diffracted and a diffraction beam which is diffracted thereby, astigmatism being generated in each of said separated two beams; and (c) detecting said dislocation from outputs of a pair of light receiving three-segment detector elements which are disposed on a same plane perpendicular to said direction of propagation of said beams and located between said two best focus points so that each of said detector elements perpendicularly receives one of said separated two beams to detect change of a beam spot size thereof, one of said detector elements being divided to three segments by divisional lines which are parallel to an arrangement line along which the two detector elements are disposed while the other detector element being divided to three segments by divisional lines which are perpendicular to said arrangement line.

10. An optical information reading and writing device according to claim 2, wherein said dual grating element is disposed on said optical path of said reflection beam in a state of being inclined with respect to an optical axis of said reflection beam.

11. A focus error detection method according to claim 7, wherein both of said two diffraction gratings have a grating pitch which is shorter than a wavelength of said incident beam.

* * * * *